(12) United States Patent
Strimling et al.

(10) Patent No.: US 7,979,312 B2
(45) Date of Patent: Jul. 12, 2011

(54) SYSTEM AND METHOD FOR FACILLITATING TRANSACTIONS IN A DISTRIBUTION NETWORK

(75) Inventors: Jon Strimling, Bedford, NH (US); Mark MacLean, Andover, MA (US)

(73) Assignee: United States Dynamics, Inc., Manchester, NH (US)

( * ) Notice: Subject to any disclaimer, the term of this patent is extended or adjusted under 35 U.S.C. 154(b) by 8 days.

(21) Appl. No.: 12/395,701

(22) Filed: Mar. 1, 2009

(65) Prior Publication Data

US 2009/0248527 A1 Oct. 1, 2009

Related U.S. Application Data

(63) Continuation of application No. PCT/US2007/077455, filed on Aug. 31, 2007.

(60) Provisional application No. 60/841,542, filed on Sep. 1, 2006, provisional application No. 60/909,843, filed on Apr. 3, 2007.

(51) Int. Cl.
    *G06Q 30/00* (2006.01)
(52) U.S. Cl. ............. 705/26; 705/27; 705/28; 705/29
(58) Field of Classification Search ............ 705/26–29, 705/1
See application file for complete search history.

(56) References Cited

U.S. PATENT DOCUMENTS

| 6,598,027 | B1 | 7/2003 | Breen, Jr. et al. |
|---|---|---|---|
| 6,957,199 | B1 | 10/2005 | Fisher |
| 7,054,844 | B2 | 5/2006 | Fletcher et al. |
| 2002/0099631 | A1 | 7/2002 | Vanker et al. |
| 2004/0181464 | A1* | 9/2004 | Vanker et al. .......... 705/26 |
| 2005/0080635 | A1* | 4/2005 | Groff et al. ............ 705/1 |
| 2005/0137935 | A1 | 6/2005 | Lee |

FOREIGN PATENT DOCUMENTS

| WO | W001/01315 | 1/2001 |
|---|---|---|
| WO | W002/37234 | 5/2002 |

OTHER PUBLICATIONS

European Extended Search Report mailed Nov. 23, 2010 in corresponding European Patent Application No. 07814643.8.
International Search Report and Written Opinion dated May 6, 2008 issued in related International Patent Application No. PCT/US07/77455.
International Preliminary Report on Patentability dated Mar. 12, 2009 issued in related International Patent Application No. PCT/US07/77455.

\* cited by examiner

*Primary Examiner* — Vanel Frenel
(74) *Attorney, Agent, or Firm* — Grossman, Tucker, Perreault & Pfleger, PLLC

(57) ABSTRACT

A system and method for facilitating transactions in a distribution network. An analysis tool may be accessed through a computer network by consumers, producers and/or distribution intermediaries. In response to an inquiry, the analysis tool may present a solution sets may to a consumer, producer, and/or distribution intermediary for optimizing interaction with the network, e.g. minimizing cost or maximizing revenue in business transactions over the network.

24 Claims, 39 Drawing Sheets

*Enter a Request For Quote* — 902

Please note that required fields are marked with bold text.

If you are an existing user, please <u>click here</u> to login.

Fuel Type: [Wood Pellets (Premium) ▾] — 904

Quantity Needed: [2 Tons ▾] — 906

Desired Delivery: [For Next Heating Season ▾] — 908

Zip Code: [01606] — 910

How were you referred to our website? [Google ▾] Specifically: [ ] — 912

Referral or Certificate Code (Affiliate Code): [PRQ1AA] — 914

[Get A Quote] — 916

FIG. 9

Quote Review Screen

We're proud to offer low prices, reasonable delivery charges and a broad geographic service area.

Request # 46404 for Zip Code (01606) (WORCESTER, MA)
                                  1002

Here is the pricing you requested, as well as other options in your area.

Home Delivery Options

| Product (1003) | Brand (1004) | Tons (1005) | Scheduled For (1006) | Fuel ($/Ton) (1007) | Delivery Charge ($/Ton) (1008) | Tax (1009) | Total (1010) | Action |
|---|---|---|---|---|---|---|---|---|
| Wood Pellets (Premium) | Pinnacle Premium | 2.4 | Late Summer / Early Fall Delivery | $209.00 | $34.58 | $0.00 | $584.60 | Purchase |

FROM FIG. 10A

Limited quantity available, offered FIRST COME, FIRST SERVICE base. With gasoline prices rising, we are now seeing both pellet and transport costs climbing, so we recommend locking in your savings now. These pellets are packaged with 60 bags per skid instead of 50 bags as is typical. So while pricing is on a per-ton basis for consistent comparison, the product actually ships in 1.2 ton increments. This source is quite far from you, so delivery charges are above normal.

| Wood Pellets (Premium) | Pinnacle Premium | 4.8 | Late Summer / Early Fall Delivery | $209.00 | $24.37 | $0.00 | $1,120.20 | Purchase — 1011 |

Limited quantity available, offered FIRST COME, FIRST SERVICE base. With gasoline prices rising, we are now seeing both pellet and transport costs climbing, so we recommend locking in your savings now. These pellets are packaged with 60 bags per skid instead of 50 bags as is typical. So while pricing is on a per-ton basis for consistent comparison, the product actually ships in 1.2 ton increments. This source is quite far from you, so delivery charges are above normal.

| Wood Pellets (Premium) | Canadian Premium (Green Supreme) | 2 | Late Summer / Early Fall Delivery | $229.00 | $39.50 | $0.00 | $537.00 | Purchase |

With gasoline prices rising, we are now seeing both pellet and transport costs climbing, so we recommend locking in your savings now.

| Wood Pellets | Canadian Premium (Green | 4 | Late Summer / Early Fall Delivery | $229.00 | $27.25 | $0.00 | $1,025.00 | Purchase |

FROM FIG. 10B (Premium) Supreme)

With gasoline prices rising, we are now seeing both pellet and transport costs climbing, so we recommend locking in your savings now.

1013

Wood Pellets (Premium) | Corinth Pellets | 2 | Late Summer / Early Fall Delivery | $219.00 | $67.50 | $0.00 | $573.00 | Check Availability This request is below our minimum quantity for this product in your area. If you click, "Check Availability", we can check to see if others in your area are also looking for product and we can consolidate your orders to make a shipment. With gasoline prices rising, we are now seeing both pellet and transport costs climbing, so we recommend locking in your savings now. This source is quite far from you, so delivery charges are above normal.

Wood Pellets (Premium) | Corinth Pellets | 8 | Late Summer / Early Fall Delivery | $219.00 | $45.38 | $0.00 | $2,115.00 | Purchase Though you requested a smaller quantity, this is our minimum delivery quantity for this product in your area. Often, our customers are able to find friends who can pool orders to get our best price. With gasoline prices rising, we are now seeing both pellet and transport costs climbing, so we recommend locking in your savings now. This source is quite far from you, so delivery charges are above normal.

FIG. 10C

Request # 28725 for Zip Code 01606 (WORCESTER, MA)

Here is the pricing you requested, as well as other options in your area.

Consumer Pickup Options

| Product | Brand | Tons | Scheduled For | Fuel ($/Ton) | Service Fee ($/Ton) | Tax | Total | Action |
|---|---|---|---|---|---|---|---|---|
| Wood Pellets (Premium) | Canadian Premium | 2 | One Day Event (Early Buy Special Event)** | $199.00 | $10.00 | $0.00 | $418.00 | Purchase |

**This one day event is scheduled for 4/28/07. Pickup location is in Westfield, MA. We recognize this is a long drive for you, but wanted to give you this option. One day events are at the lowest possible price - no other discounts or credits may be applied.

| Wood Pellets (Premium) | Quality | 2.4 | One Day Event (Early Buy Special Event)** | $199.00 | $0.00 | $0.00 | $477.60 | Purchase |

FROM FIG. 11A

**This one day event is scheduled for 4/28/07. Pickup location is in Westfield, MA. We recognize this is a long drive for you, but wanted to give you this option. One day events are at the lowest possible price - no other discounts or credits may be applied. This product ships 1.2 tons per skid. You get 20% more product at the same price per bag.

Home Delivery Options — 1103

| Product | Brand | Tons | Scheduled For | Fuel ($/Ton) | Delivery Charge ($/Ton) | Tax | Total | Action |
|---|---|---|---|---|---|---|---|---|
| Wood Pellets (Premium) | Canadian Premium | 2 | Early Buy Program — 1104 | $199.00 | $37.50 | $0.00 | $473.00 | Purchase |

Get our best pricing of the year by taking delivery during the off-season.

| Wood Pellets (Premium) | Canadian Premium | 2 | Early Buy (with storage until Aug-Sep) — 1105 | $219.00 | $37.50 | $0.00 | $513.00 | Purchase |

FROM FIG. 11B

With oil prices rising, why hunt for pellets during the typical fall rush? You can lock in low prices now on top quality product, and we will store it for you for the summer.

Wood
Pellets  Quality  2.4  Early Buy Program  $199.00  $32.92  $0.00  $556.60  Purchase
(Premium)

Get our best pricing of the year by taking delivery during the off-season. This product ships 1.2 tons per skid. You get 20% more product at the same price per bag. This source is quite far from you, so delivery charges are above normal.

Wood
Pellets  Quality  2.4  Early Buy (with storage until  $219.00  $32.92  $0.00  $604.60  Purchase
(Premium)              Aug-Sep)

With oil prices rising, why hunt for pellets during the typical fall rush? You can lock in low prices now on top quality product, and we will store it for you for the summer. This product ships 1.2 tons per skid. You get 20% more product at the same

FIG. 11C

AmericanBiomass.net Exclusives

Options Available for Zip Code 03101 (MANCHESTER, NH)

| Product | Brand | Total Delivered Cost ($/Ton, including Freight) | Truck Loads | Total Qty | Trailer Type | Action |
|---|---|---|---|---|---|---|
| Wood Pellets (Premium) | Brand A | $169.47 | 1 ▼ | 24 tons | Flatbed | Purchase |

Availability: Approx 2-3 weeks (Sometimes sooner)
Notes:

Commercial Affiliates

Options Available for Zip Code 03101 (MANCHESTER, NH)

FROM FIG. 12A

| Product | Brand | Total Delivered Cost ($/Ton, including Freight) | Truck Loads | Total Qty | Trailer Type | Action |
|---|---|---|---|---|---|---|
| Wood Pellets (Premium) | Brand B | $181.33 | 1 ▶ | 24 tons | Flatbed | Purchase |
| Availability: Approx 2-3 weeks (Sometimes sooner) | | | | | | |
| Notes: | | | | | | |
| Wood Pellets (Premium) | Brand B | $181.33 | 1 ▶ | 24 tons | Box | Purchase |
| Availability: Approx 2-3 weeks (Sometimes sooner) | | | | | | |
| Notes: | | | | | | |
| Wood Pellets (Premium) | Brand C | $204.27** | 1 ▶ | 24 tons | Flatbed | Get Firm Quote** |
| Availability: Approx 2-3 weeks (Sometimes sooner) | | | | | | |
| Notes: **We have to check with our network of affiliated carriers to firm up delivery of this product to your location. Please click "Get Firm Quote" if you would like us to do so, and we'll get back to you. | | | | | | |
| Wood Pellets (Premium) | Brand C | $204.27 | 1 ▶ | 24 tons | Box | Purchase |
| Availability: Approx 2-3 weeks (Sometimes sooner) | | | | | | |
| Notes: | | | | | | |

FROM FIG. 12B

Wood Pellets (Premium)   Brand D   $211.08   [1 ▼]   24 tons   Flatbed   Purchase Availability: Approx 2-3 weeks (Sometimes sooner)
Notes:

Wood Pellets (Premium)   Brand D   $211.08   [1 ▼]   24 tons   Box   Get Firm Quote

Availability: Approx 2-3 weeks (Sometimes sooner)
Notes: **We have to check with our network of affiliated carriers to firm up delivery of this product to your location. Please click "Get Firm Quote" if you would like us to do so, and we'll get back to you.

Promotional Affiliates

Other brands currently available in your region

Brand E      Contact Information      Website

Brand F      Contact Information      Website

Brand G      Contact Information      Website

For a nationwide list of other manufacturers who may have fuel available, click here.

BILLING RATES

| $200 | PER TRUCKLOAD (BASE) |
| $1.50 | PER MILE |
| $100 | PER DROP |

EQUIPMENT TYPE

☒ BOX TRAILERS

☐ FLATBED TRAILERS

☐ INTERMODAL

☐ BULK TRANSPORT

STATES SERVED

☐ AK

☒ AZ

☒ CT

☐ DE

☐ ETC

$2.50 PER MONTH PER PALLET $200 PER TRUCKLOAD $30 PER TON FROM BULK TO BAGGED

FIG. 14

SERVICES PROVIDED

☑ STORAGE

☑ PICKUP SERVICE

☐ PACKAGING

1500

| | |
|---|---|
| PRODUCT: | WOOD PRICES (PREMIUM) |
| BRAND: | QUANTITY FIRST BRAND |
| QUANTITY AVAILABLE: | 1,500 TONS |
| NEXT SHIPMENT AVAILABLE: | IMMEDIATELY |
| LOCATION (ZIP): | 12345 |
| PRICE: | $200 PER TON |

FIG. 15

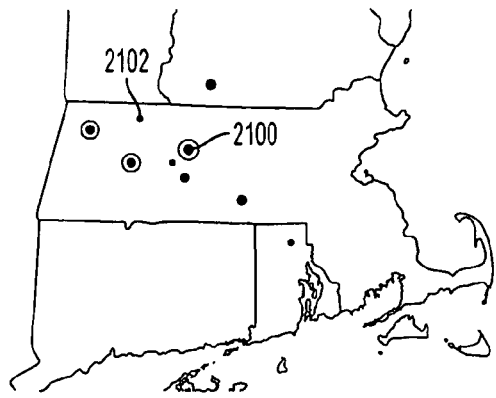
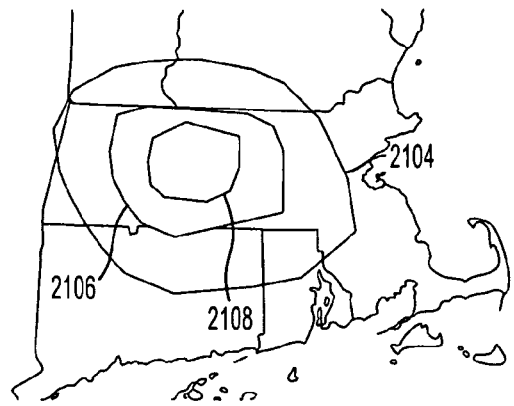
FIG. 21A  FIG. 21B
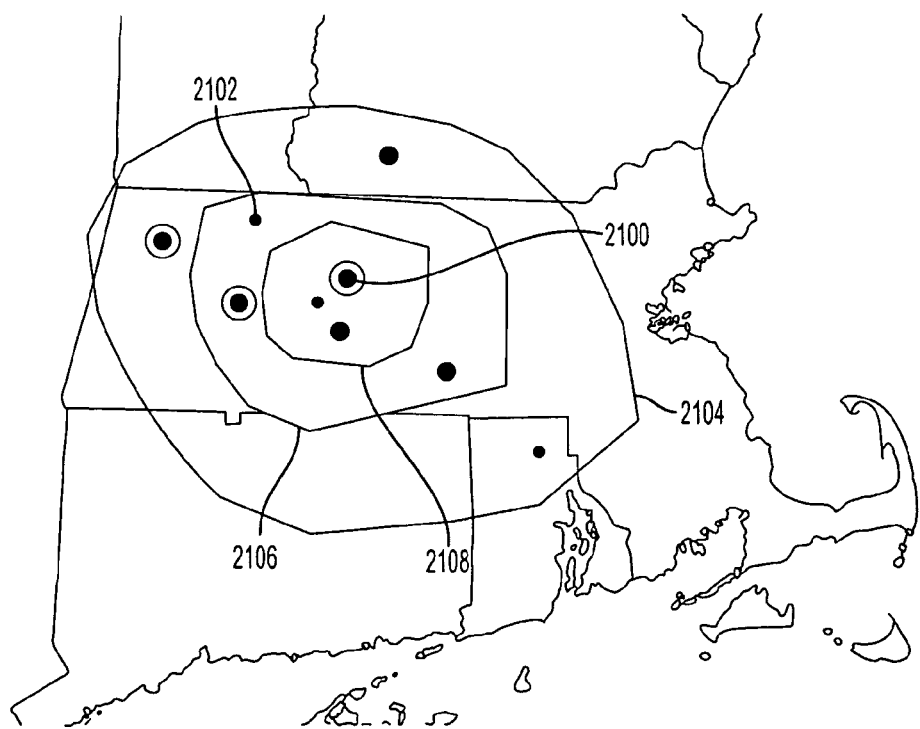
FIG. 21C

SYSTEM AND METHOD FOR FACILLITATING TRANSACTIONS IN A DISTRIBUTION NETWORK

CROSS-REFERENCE TO RELATED APPLICATIONS

This present application is a continuation of PCT Application Ser. No. PCT/US07/77455, filed Aug. 31, 2007, which claims the benefit of the filing dates of U.S. Provisional Patent Application Ser. No. 60/841,542, filed on Sep. 1, 2006 and U.S. Provisional Patent Application Ser. No. 60/909,843, filed Apr. 3, 2007, the teachings of which applications are fully incorporated herein by reference.

TECHNICAL FIELD

The present invention relates to distribution networks between buyers and sellers, and to a system and method for facilitating transactions in a distribution network.

BACKGROUND

In the distribution of goods and services, multi-channel distribution networks may be established. A multi-channel distribution network may provide multiple channels for distribution from a producer to a consumer. Separate distribution channels may, for example, extend through local distributors, retailers, packaging contractors, etc. The cost of delivery of the goods or services through the respective channels in the multi-channel distribution network may vary, thereby resulting in a cost to the consumer that varies depending on the distribution channel through which the goods or services are purchased. Likewise, the revenue obtained through sale of goods or services may vary depending in a multi-channel distribution network, depending on the delivery channel to the consumer.

One disadvantage of known systems is a lack of systemic visibility. Consumers may not be able to obtain visibility into supply sources upstream of their local retailer (e.g. other distribution intermediaries and producers), and producers and distribution intermediaries may not have visibility into demand downstream of their retail affiliates. Another disadvantage of known systems are limitations in responding to local needs, where a host of products and services may be available on a nationwide basis, but consumers, producers and distribution intermediaries may not have visibility to the most appropriate local options for addressing their needs.

BRIEF DESCRIPTION OF THE DRAWINGS

These and other features and advantages will be better understood by reading the following detailed description, taken together with the drawings wherein:

FIG. 9 is a screen shot of a portion of a consumer interface consistent with the present disclosure;

FIG. 10 is a screen shot of another portion of a consumer interface consistent with the present disclosure;

FIG. 11 is a screen shot of another portion of a consumer interface consistent with the present disclosure;

FIG. 12 is a screen shot of another portion of a consumer interface consistent with the present disclosure;

FIG. 13 is a screen shot of a portion of a distribution intermediary interface consistent with the present disclosure;

FIG. 14 is a screen shot of a portion of another distribution intermediary interface consistent with the present disclosure;

FIG. 15 is a screen shot of a portion of a producer interface consistent with the present disclosure;

FIGS. 21A, 21B and 21C illustrate an exemplary method involving regional minimum quantities and auto-acceptance quantities consistent with the present disclosure;

DETAILED DESCRIPTION

Aspects of the present disclosure may relate to facilitating business transactions in a multi-channel distribution network. A "multi-channel distribution network" as used herein refers to a network including a plurality of at least partially separate channels of distribution from a producer of goods or services to a consumer. A distribution channel in a multi-channel distribution network may be at least partially separate from another distribution channel in the multi-channel distribution network if it includes at least one distribution intermediary not present in the other distribution channel. A "distribution intermediary" as used herein refers to a person or entity other than the producer or consumer that sells, distributes, or contracts for sale or distribution of goods or services in the multi-channel distribution network, and includes, for example, agents selling directly on behalf of a producer, packagers that package goods received from producers, distributors or wholesalers that sell to retailers, storage and handling locations, contract shipping entities, financial agents that agree to contracts to purchase and/or sell at a future date and retailers or dealers that sell to consumers. One or more channels in a multi-channel distribution network may be a multi-level channel. A "multi-level channel" as used herein refers to a distribution channel including at least two distribution intermediaries. A distribution network may be a "multi-level distribution network" if the distribution network includes sales to both end-consumers and redistributors, for example including both wholesale and retail sales.

For simplicity of explanation, the various exemplary embodiments disclosed herein may be described in the context of a multi-channel distribution network associated with specific goods. In particular, exemplary embodiments may be described in connection with goods, such as heating fuels, bulk landscaping products, building materials, etc., where delivery costs may be considered as a factor in the purchase decision, or where specialized equipment may be necessary for delivery of the product. It is to be understood, however, that the embodiments described herein are presented by way of illustration, not of limitation. For example, a system and method consistent with the present disclosure is not limited to any specific goods or distribution networks for distributing goods alone, and may be equally useful in connection with moving a service from a producer to consumer.

Figure 1:
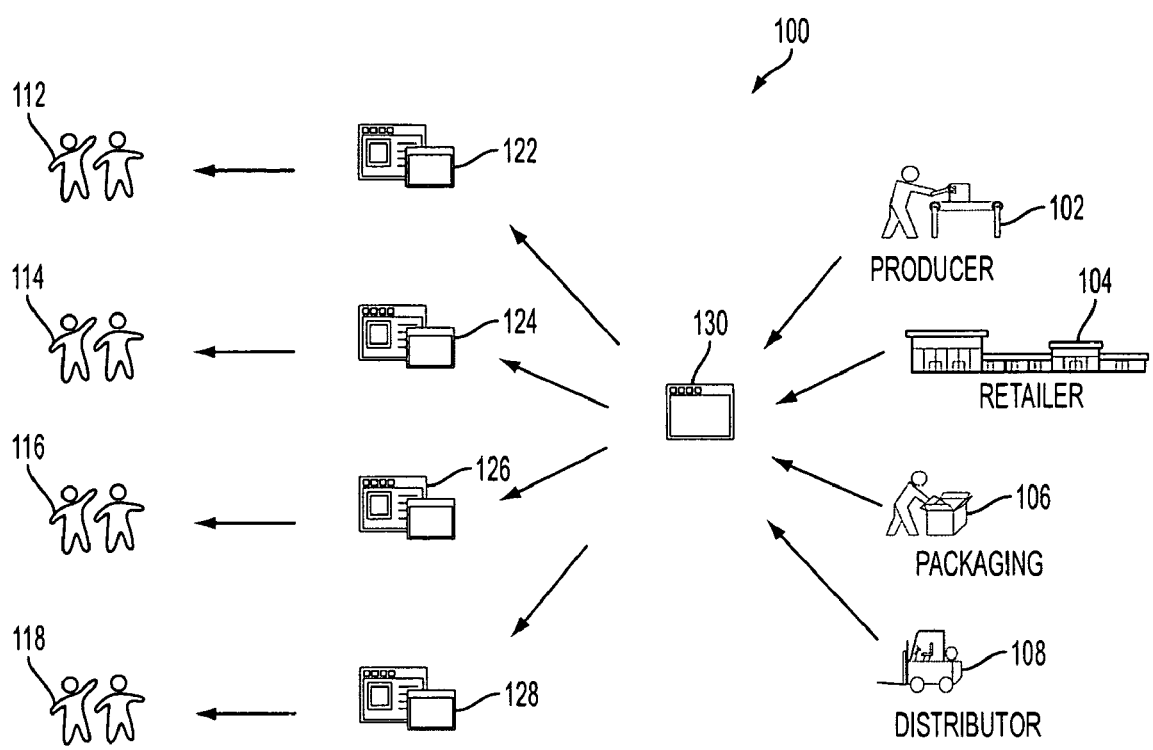
FIG. 1 is a diagrammatic view of an exemplary system consistent with the present disclosure.

Referring to FIG. 1, a system facilitating transactions in a multi-channel distribution network 100 consistent with the present disclosure may connect a producers of goods and/or services 102 and/or distribution intermediaries such as retailers 104, packaging facilities 106, distributors 108, etc., with consumers 112, 114, 116, 118 via web sites 122, 124, 126, 128 that provide access to an analysis tool 130. The third party suppliers and/or distribution intermediaries may provide supply and distribution parameters for offering goods and/or services to consumers through the system. The consumers may provide demand parameters to the analysis tool for inquiring as to the delivered cost of the goods or services.

The analysis tool may thus connect a wide range of consumers, producers and distribution intermediaries for streamlining the sale and/or distribution of goods by analyzing a distribution network to generate and present a set of options to a user. For example, the system may allow consumers to obtain visibility to both regional product availability and delivery charges to that consumer's specific location from a plurality of at least partially separate distribution channels in a multi-channel distribution network. The system may also or alternatively allow producers and distribution intermediaries in a multi-channel distribution network to gain visibility to demand distributions in a distribution system in order to increase the value obtained for a fixed supply of a delivered product.

The analysis tool may provide a valuable benefit of prioritizing and filtering solutions sets presented to a user. A consumer wishing to buy product may be presented with a set of options representing the lowest cost set of product or service options available in the consumer's location and/or a set of options representing the most readily available options. A producer may be presented with a set of options representing the subset of consumers that will net the producer the highest value for his products or services, net of costs of distributing the products or services. A distribution intermediary may be presented with a set of options for connecting a subset of producers with a subset of consumers through paths that may include a subset of other distribution intermediaries, in a manner that meets the specified goals of the distribution intermediary acting as a user of the system, for example in a manner that maximizes his profitability.

Figure 2:
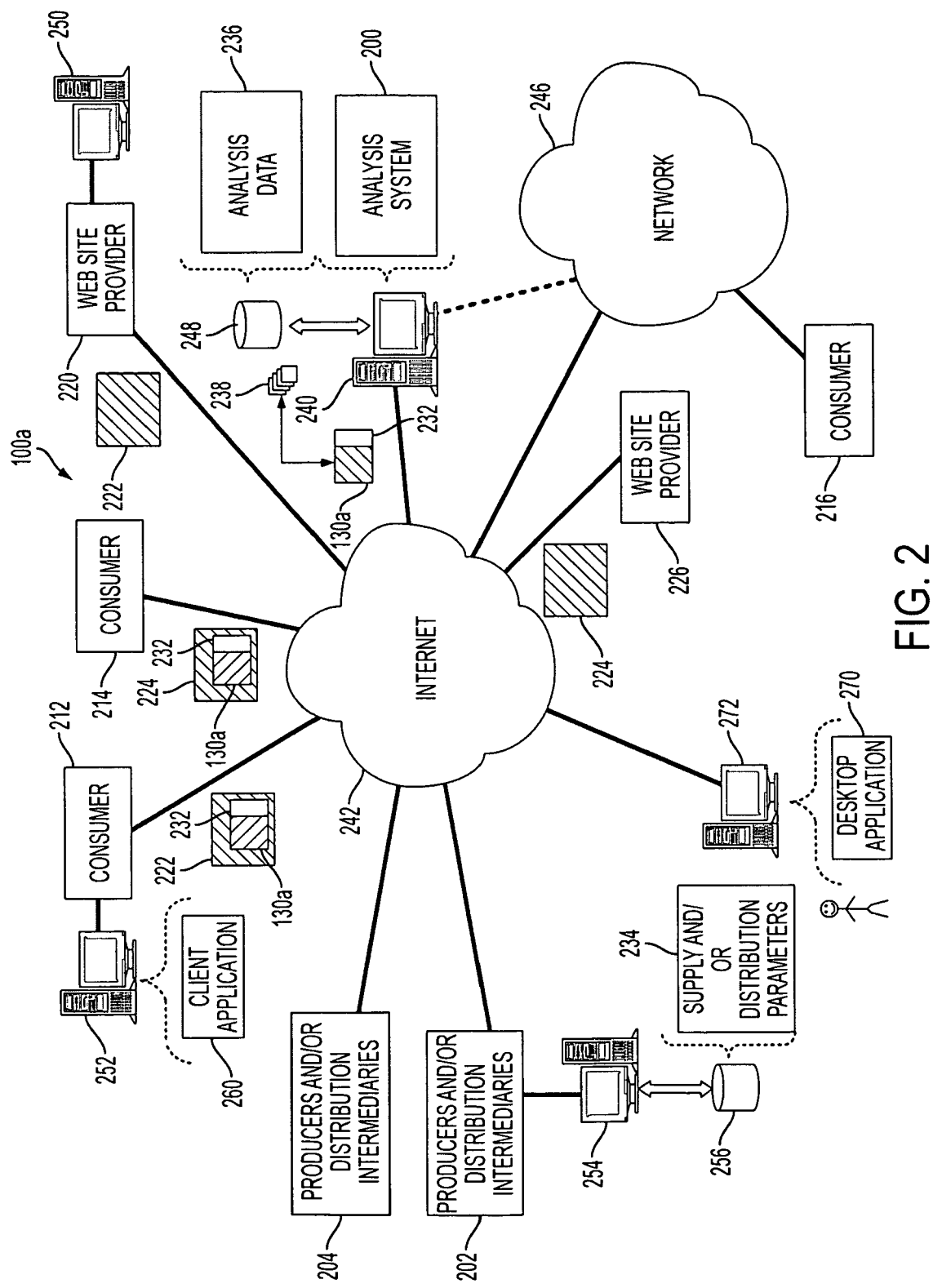
FIG. 2 is a diagrammatic view of another exemplary system consistent the present disclosure.

FIG. 2 diagrammatically illustrates one exemplary embodiment of a system 100a consistent with the present disclosure that may be used to facilitate transactions between producers and/or distribution intermediaries 202, 204 in a multilevel distribution network and consumers 212, 214, 216. An analysis system 200 may provide access to an analysis tool 130a to be used by consumers, producers and/or distribution intermediaries for facilitating business opportunities, e.g. business transactions, related to goods and/or services 232 available from the producers and/or distribution intermediaries 202, 204. The product/services 232 may be associated with supply and distribution parameters 234 provided by the producers and/or distribution intermediaries 202, 204. The consumers 212, 214, 216 may access the analysis tool to obtain delivered cost quotations for the goods and/or services 232 from a plurality of separate distribution channels in a multi-channel distribution network via one or more web sites 222, 224 hosted by web site providers 220, 226. Producers and/or distribution intermediaries 202, 204 may also access the analysis tool to determine sales opportunities to consumers allowing maximum associated revenue.

The analysis tool 130a may be used to generate one or solution sets 238 (e.g. price quotations or sales opportunity lists) for a consumer or a producer or distribution intermediary using supply parameter and distribution parameters provided by producers and/or distribution intermediaries and consumer inquiry information provided by consumers. The solution sets 238 may be accessed via any one or more of the web sites 222, 224 that provide access to the analysis tool 130a. In connection with generating solution sets using the analysis tool 130a, the analysis system 200 may use stored analysis data 236, such as stored consumer inquires, supply parameters, distribution parameters, etc., as will be described in greater detail below.

The system 200 may reside on and may be executed by a computer 240 that is connected to computer network 242 (e.g., a global computer network, such as the Internet). Computer 240 may be a web server running a network operating system, such as Microsoft Windows XP Server™, Novell Netware™, or Redhat Linux™. Computer 240 may also execute a web server application, such as Microsoft IIS™, Novell Webserver™, or Apache Webserver™, that allows for HTTP (i.e., HyperText Transfer Protocol) access to computer 240 via network 242. The system 200 may also use the Microsoft .NET™ Framework as the overall technology platform. Network 242 may be connected to one or more secondary networks (e.g., network 246), such as a local area network, a wide area network, or an intranet.

The instruction sets and subroutines of the of the analysis system 200 may be stored on a storage device (e.g., a storage device 248 coupled to computer 240) and may be executed by one or more processors (not shown) and one or more memory architectures (not shown) incorporated into computer 240. Analysis data 236 generated by and/or used by the analysis system 200 may also be stored on a storage device (e.g., storage device 248 coupled to computer 240). The storage device may be, for example, a hard disk drive, a tape drive, an optical drive, a RAID array, a random access memory (RAM), or a read-only memory (ROM). A relational database management system (not shown), such as Microsoft SQL Server 2005, may be used to manage the analysis data 236.

An Application Service Provider (ASP) may host one or more application components of the system 200 and the analysis data 236. The ASP may thus handle application support and storage of data such as usernames, passwords, etc. The ASP may also handle reporting of certain data such as new registered users and contact information (e.g., email addresses), saved solution sets, user information, etc. One of the web site providers 220, 226 may also host the analysis system 200 and the analysis data 236.

All or a portion of the analysis system 200 may also reside on and/or be executed other computers such as web site provider computers 250, consumer computers 252 and/or producer and/or distribution intermediary computers 254. At least a portion of the analysis tool 130a, for example, may be executed on the consumer computers 252, for example, as an Active X™ control, a Java™ Applet, or a Adobe™ Flash file, as the consumer uses the 130a. All or a portion of the analysis data 236 may also be stored on other storage devices, for example, coupled to web site provider computers 250, consumer computers 252 and/or producer and/or distribution intermediary computers 254.

A storage device 256 may also be coupled to a producer and/or distribution intermediary computer 254 for storing product and/or service data 234 for the producer and/or distribution intermediary 202, for example, in product catalog database. The analysis system 200 may pull real-time product data from the product catalog database (e.g., using XML calls) and integrate that product data into the analysis tool 130a. Changes to the catalog data may thus be reflected in the analysis tool when the changes are made to the catalog database. The product and/or service data 234 may also be stored with the analysis data 236 on the storage device 248 (e.g., hosted by an ASP).

Consumers 212, 214, 216 may access the system 200 directly through network 242 or through secondary computer network (e.g., network 246). The computer 240 (i.e., the computer that executes the analysis system 200) may be connected to network 242 through a secondary network (e.g., network 246). Consumers 212, 214, 216 may access the analysis system 200 through a computer (e.g., computer 252) that is connected to network 242 (or network 246) and executes a desktop application 260 (e.g., Microsoft Internet Explorer®, Netscape Navigator®, or a specialized interface). The computer 252 may be the consumer's PC or MAC® computer or may be a computer terminal located at a location of a producer and/or distribution intermediary or web site provider.

An administrator may access and administer the analysis system 200 through a desktop application 270 (e.g., Microsoft Internet Explorer®, Netscape Navigator®, or a specialized interface) running on an administrative computer 272 that is also connected to the network 242 (or network 246). The administrative computer 272 may be located at the same location as the analysis system 200 or remotely.

In one embodiment, a consumer may use an analysis tool 130 to generate a a consumer inquiry to the analysis system 200. The analysis system 200 may be configured to generate a solution set 238 based on, at least in part, one or more of supply parameters and distribution parameters provided by producers and/or distribution intermediaries. The analysis system may be configured to generate the solution set presenting reduced or minimized cost or time to delivery of a product to the consumer. For example, the analysis system 200 may generate several options for purchase of product and delivery services including information on both product and delivery parameters, which may include cost, quality, timing of availability and combinations thereof. In one example involving fuel transactions, the options may include a display of information on the cost per energy content, e.g. cost/BTU. As will be discussed in greater detail below, the set of options (i.e. the solution set) presented to the consumer may be filtered based on one or more user definable criteria and/or parameters (e.g., only the optimal channel as defined by the user), a set of options that are nearly optimal, or the entire set of potential options for supply and distribution channels.

Figure 3:
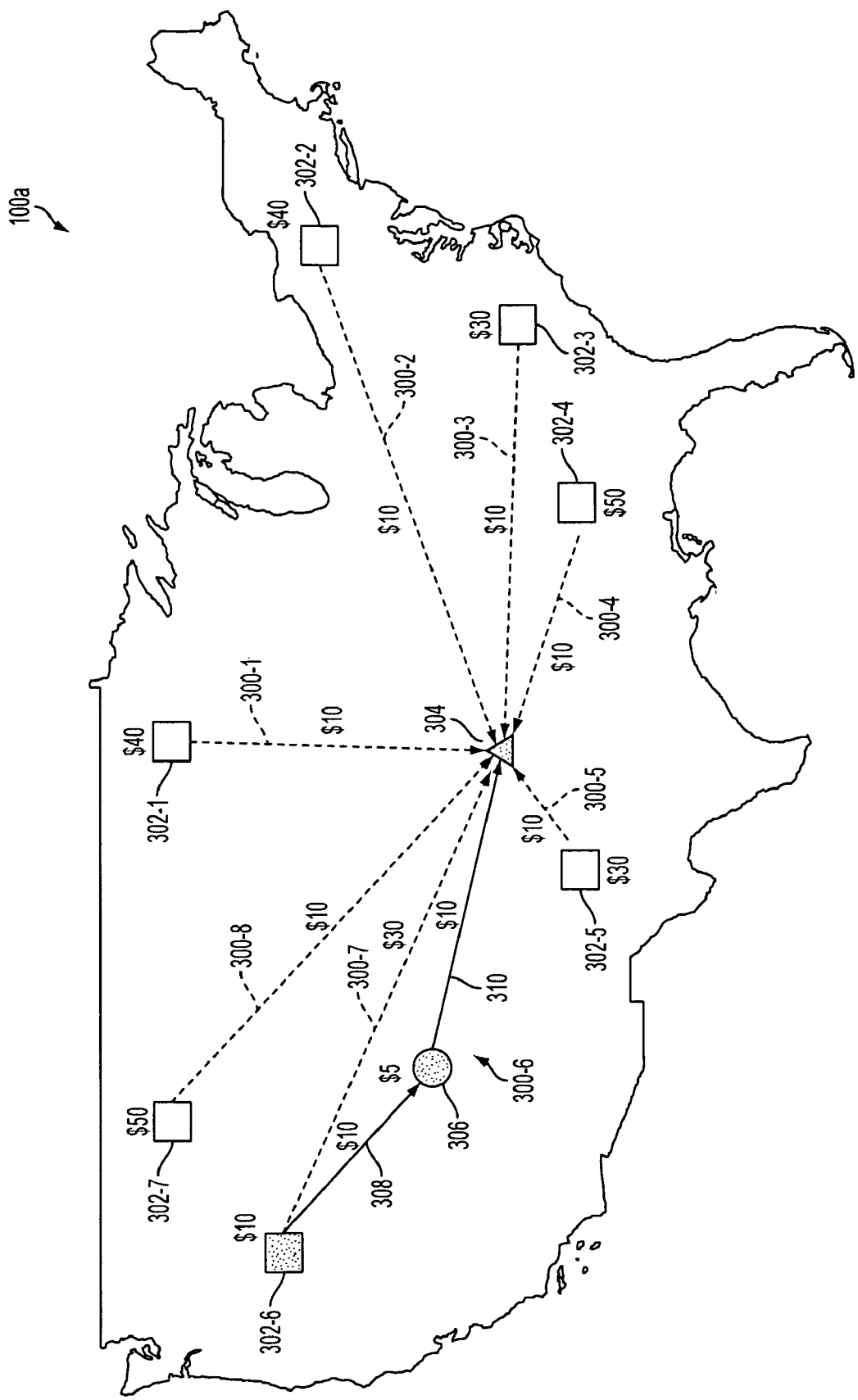
FIG. 3 diagrammatically illustrates one system and method consistent with the present disclosure for facilitating consumer purchase of goods or services in a multi-channel distribution network consistent with the present disclosure.

FIG. 3 diagrammatically illustrates one example of operation of a system consistent with the present disclosure for presenting a solution set to a consumer. As shown, a distribution network 100a may include multiple separate distribution channels 300-1, 300-2, 300-3, 300-4, 300-5, 300-6, 300-7, 300-8 for delivering a product from one or more producers 302-1, 302-2, 302-3, 302-4, 302-5, 302-6, 302-7 to a consumer 304. For example, channels to the consumer 304 may include direct channels 300-1, 300-2, 300-3, 300-4, 300-5, 300-7, 300-8 or multi-level channel 300-6 including distribution intermediary 306. In the illustrated exemplary embodiment, multi-level channel 300-6 includes a distribution intermediary for delivering goods or services along path 308 from producer 302-6 to distribution intermediary 306 and a path 310 from the distribution intermediary 306 to the consumer 304.

The dollar figures adjacent producers 302-1, 302-2, 302-3, 302-4, 302-5, 302-6, 302-7 and distribution intermediary 306 represent the cost of the product at the associated producer or distribution intermediary, and the dollar figures along the distribution channels 300-1, 300-2, 300-3, 300-4, 300-5, 300-7, 300-8 and paths 308 and 310 represent delivery costs along the distribution channel or path. In the illustrated exemplary embodiment, product may flow along multi-level channel 300-6 from the producer 302-6 to consumer 304, with a $10 product cost at the producer 302-6 and along path 308 to distribution intermediary 306 with a $10 delivery cost. The product cost at the distribution intermediary may be $5 and the cost of delivery along path 310 to the consumer 304 may be $10. The resulting total delivered cost the consumer along path 300-6 may be $35, which includes at total of $10 in product costs and a total of $25 in delivery costs.

The option of purchasing the product through multi-level channel 300-6 at a total delivered cost of $35 may be presented to the consumer option in a solution set along with the option of purchasing product through distribution channels 300-3, 300-5 and 300-7 which may each have total delivered product costs of $40. In one embodiment, product delivered through distribution channels 300-1, 300-2, 300-4 and 300-8 may not be presented as part of a solution set to the consumer 304 due to their relatively higher delivered cost. Advantageously, a system and method according to the present disclosure may allow a consumer to be presented a solution set including a plurality of delivery options that analyze multiple distribution channels from producer to consumer in a multi-channel distribution network and choose among those options. Although the illustrated embodiment is described as presenting a solution set involving cost minimization within a multi-channel distribution network, selection of product and distribution channels may determined based on, at least in part, the timing of delivery or other factors of concern to the specific consumer 304, or by a weighted objective function driven by multiple factors such as cost, timing and product quality.

According to another embodiment of the present disclosure the distribution network 100a configured to generate a solution set based on, at least in part, an aggregate demand from multiple consumers located at geographically different locations wherein a plurality of producers may bid for the right to supply product to that group of consumers in an auction format. The analysis system may determine time and/or costs associated with moving the product from producers to these consumers based on, at least in part, one or more of the analysis tool inputs representing the aggregate demand from multiple consumers, the set of distribution parameters and the set of producer bids. For example, if the consumer 304 is considered to be an aggregate group of geographically dispersed consumers desiring to minimize cost, the analysis system may provide a solution set identifying the lowest net average delivered cost to the agreggated group.

The plurality of consumers may also be geographically partitioned into two or more groups in which a set of solutions may be generated for each group. It may also be useful in some instances to generate a set of solutions 3 for the groups utilizing an iterative process based on successive trials at regional grouping strategies before selecting a grouping strategy that provides the optimal distribution scenario for a given set of aggregated consumers. A similar aggregation strategy may be performed for producers, such that the selling price (net of distribution costs) to the aggregated group of producer's facilities may be maximized.

Figure 4:
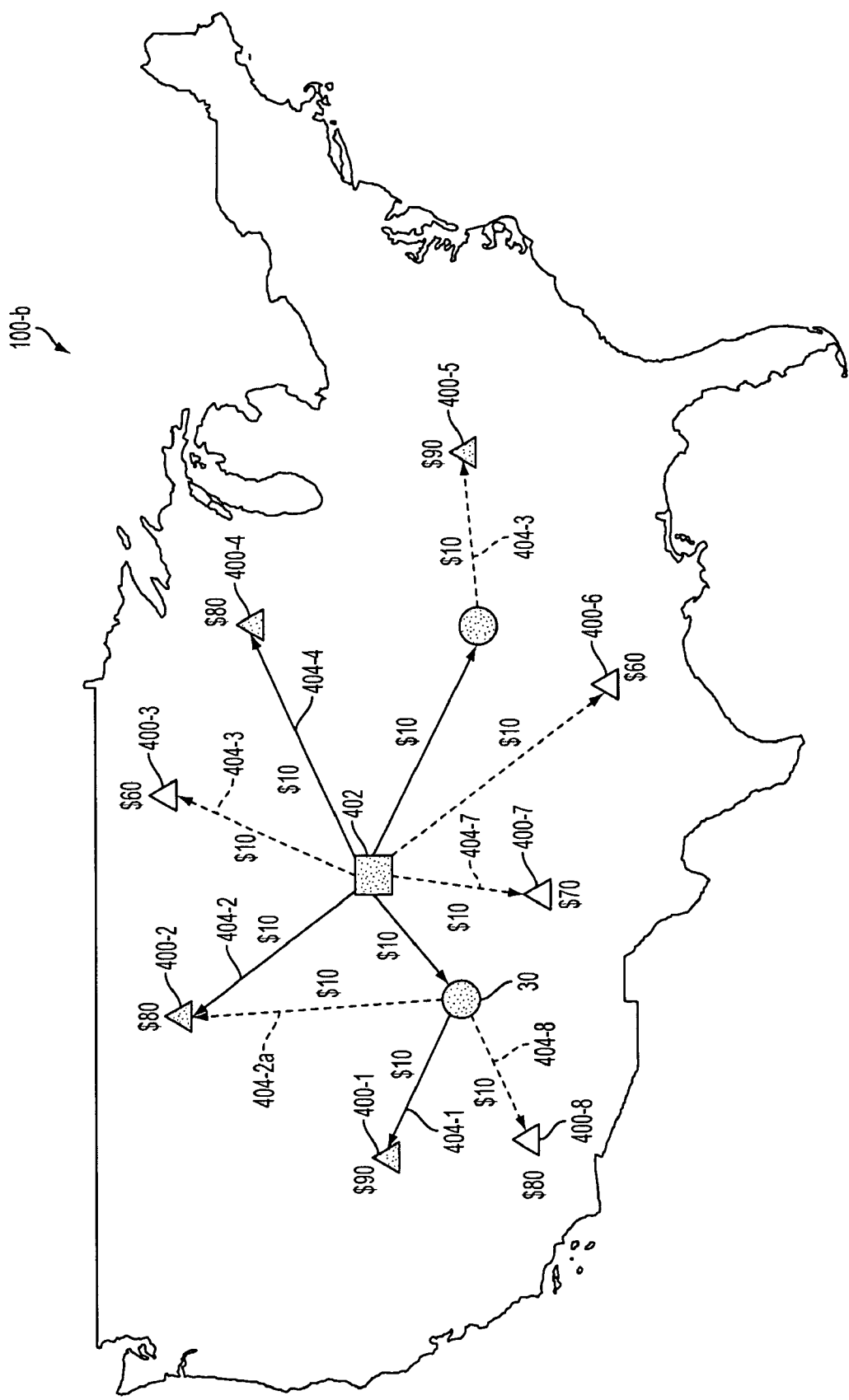
FIG. 4 diagrammatically illustrates one system and method consistent with the present disclosure for facilitating producer sale of goods or services in a multi-channel distribution network consistent with the present disclosure.

Turning now to FIG. 4, a system and method according to the present disclosure may also or alternatively be utilized for the benefit of a producer seeking to reduce its downstream distribution costs and connect according to a more direct and profitable channels to its consumers. In the illustrated exemplary embodiment, a distribution network 100b may include a plurality of consumers 400-1, 400-2, 400-3, 400-4, 400-5, 400-6, 400-7, 400-8 that are willing to pay a specific associated price for a product as noted in dollars adjacent each consumer. To provide product from the producer 402 to the consumers 400-1, 400-2, 400-3, 400-4, 400-5, 400-6, 400-7, 400-8, the product may travel along associated distribution channels 404-1, 404-2, 404-2a, 404-3, 404-4, 404-5, 404-6, 404-7, 404-8. The delivery cost to the producer along the distribution channels is noted in dollars adjacent each channel or distribution path associated therewith. The analysis system 200 may be configured to determine which of the plurality of available distribution channels may result in the maximum profit for the producer 402.

For example, the analysis system 200 may be configured to subtract the distribution costs from the prices consumers 400-1, 400-2, 400-3, 400-4, 400-5, 400-6, 400-7, 400-8 are willing to pay to determine which of the plurality of available distribution channels 404-1, 404-2, 404-2a, 404-3, 404-4, 404-5, 404-6, 404-7, 404-8 may result in the maximum profit for the producer 402. In the illustrated embodiment, the analysis system 200 may determine that the producer 402 may realize at least $70 in net revenues after accounting for distribution costs from consumers 400-1, 400-2, 400-4 and 400-5 and may present such options as a solution set to the producer 402. Additionally or alternatively, a producer desiring to move product quickly may utilize a distribution system and method consistent with the present disclosure to determine which consumers could rapidly take delivery through the distribution network.

Figure 5:
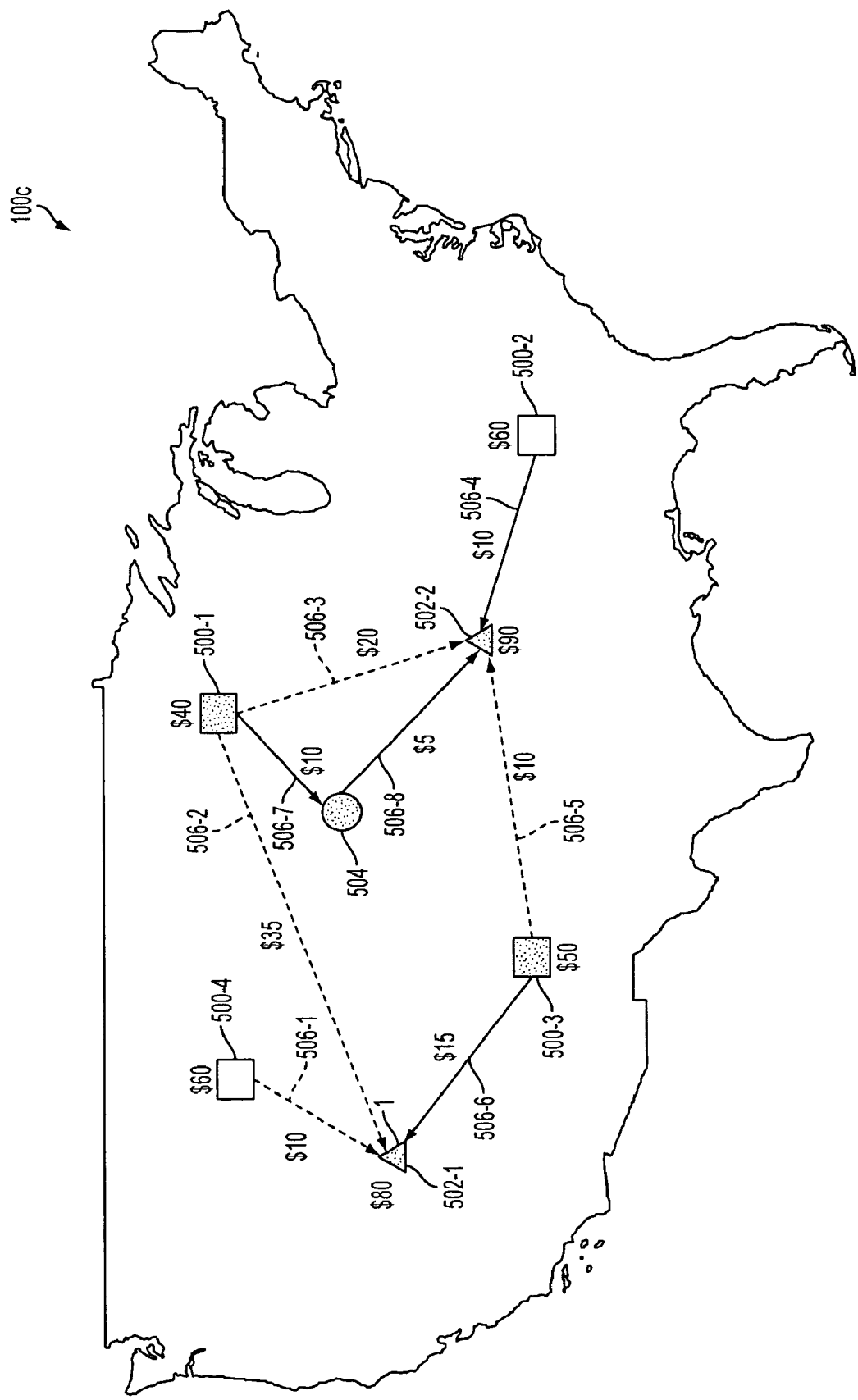
FIG. 5 diagrammatically illustrates one system and method consistent with the present disclosure for facilitating distribution intermediary sale of goods or services in a multi-channel distribution network consistent with the present disclosure.

As illustrated in FIG. 5, a system and method according to the present disclosure may also or alternatively be utilized by a distribution intermediary to profitably connect supply and demand according to profitable channels. For example, a distributor may calculate optimal product flow channels to maximize distributor profitability and/or present purchase opportunities to consumers or sales opportunities to producers or other distribution intermediaries in such a manner that the distribution channels between the consumers and producers or other third party intermediaries have been independently considered.

As shown, distribution network 100c may include a distribution intermediary 504, plurality of potential producers 500-1, 500-2, 500-3, 500-4 of product and a plurality of consumers 502-1, 502-2. The product cost associated with each producer is noted in dollar figures adjacent each producer and the price each consumer is willing to pay for the product is noted in dollars adjacent each consumer. The delivery cost to the consumer or distributor along each of a plurality of distribution channels 506-1, 506-2, 506-3, 506-4, 506-5, 505-6, 505-7, 505-8 is noted in dollars adjacent each channel.

In the illustrated exemplary embodiment, it may be possible for the distribution intermediary 504 to arrange delivery of product to the consumer 502-1 from producers 500-1, 500-3 or 500-4 through distribution channels 506-2, 506-6 and 506-1, respectively, with delivered product cost to the consumer of $75, $65 and $70, respectively. The distributor may choose to provide product from producer 500-3 to maximize the distributor profit of the $80 price the consumer 502-1 is willing to pay. Similarly, consumer 502-2 may be provided product from producer 500-1 along distribution channel 506-3 or distribution channels 506-7 and 506-8 through the distribution intermediary 504, or directly from producers 500-2 and 500-3. In illustrated embodiment, the lowest delivered cost channel is via channels 506-7 and 506-8 through the distribution intermediary 504, so choosing this distribution channel may result in maximum profit to the distributor.

Figure 6:
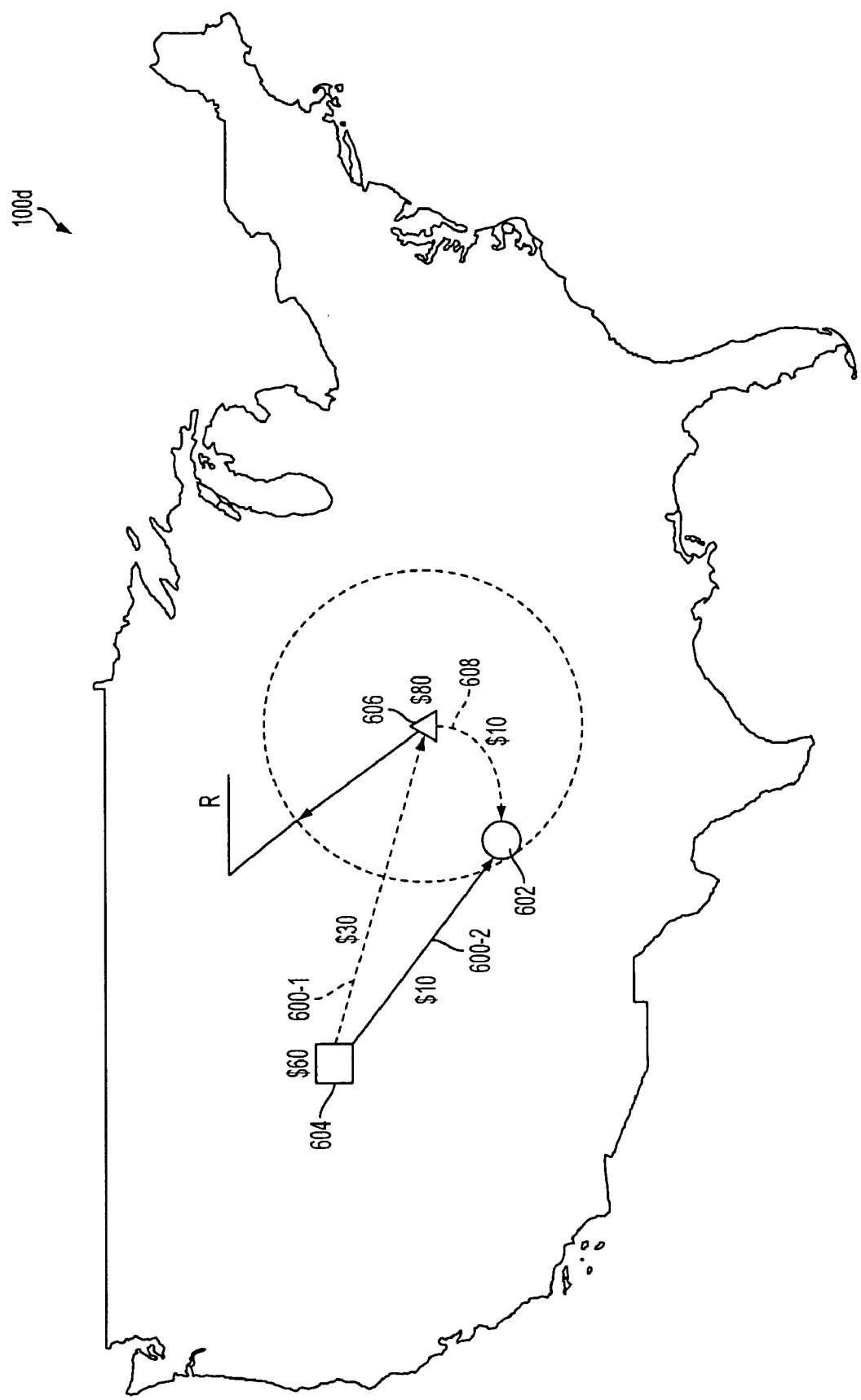
FIG. 6 diagrammatically illustrates another system and method consistent with the present disclosure for facilitating consumer purchase of goods or services in a multi-channel distribution network consistent with the present disclosure.

FIG. 6 illustrates another exemplary embodiment of a system and method according to the present disclosure wherein a consumer may be provided an option to pick up a product at a location within some geographic radius R, or alternatively may be offered the option of delivery to a desired location. As shown, a distribution network 100d may include a distribution intermediary 602, a producer 604, and a consumer 606. The product cost associated with the producer is noted in dollar figures adjacent the producer and the price the consumer is willing to pay for the product is noted in dollars adjacent the consumer. The delivery cost to the consumer or distributor along each of a plurality of distribution channels 600-1, 600-2 is noted in dollars adjacent each channel.

As shown, a distribution network 100*d* may include a distribution channel 600-1 directly between the producer and the consumer's location. The consumer 606 may indicate a willingness to travel a distance of no more than radius R as long as he can save $10. Based on these demand parameters, a distribution system and method according to the present disclosure may determine that the product may be delivered directly to the consumer via channel 600-1 for a cost of $30. Additionally or alternatively, the distribution system may determine that the product maybe delivered to distribution intermediary 602 (which may be located within the radius R) for $10 and that the costs associated with picking up the product at distribution intermediary 602 (as indicated along pickup path 608) may also be $10. The effective net cost to the consumer associated with channel 600-2 and pick-up path 608 $80 as opposed to $90 via channel 600-1. The option of purchasing the product through either of the distribution channels, 600-1 or 600-2 may be presented to the consumer. Given this consumer's preference in this example, the consumer 606 may prefer to pick-up the product at distribution intermediary 602 rather than have it delivered directly to his location through distribution channel 600-1.

Figure 7:
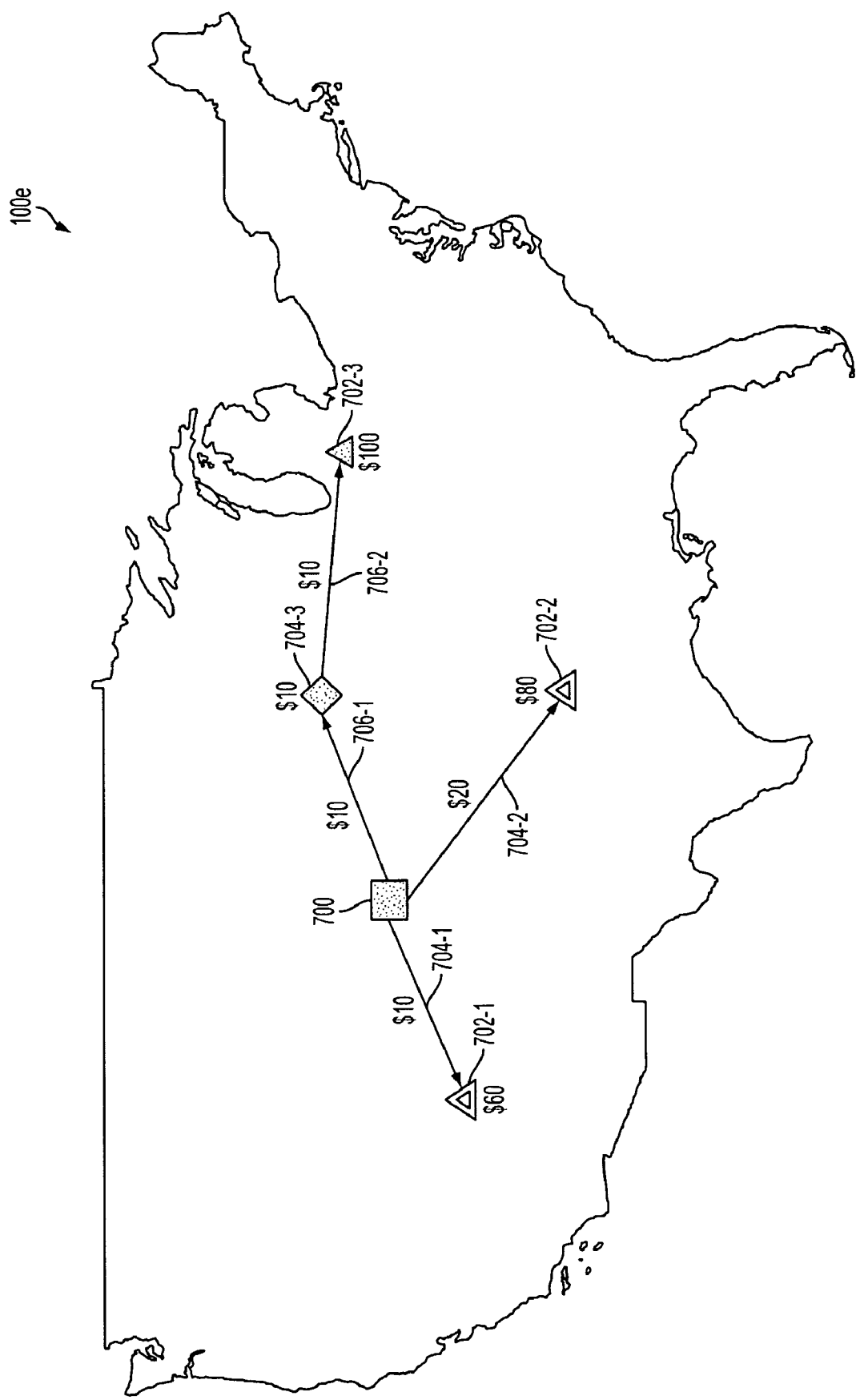
FIG. 7 diagrammatically illustrates another system and method consistent with the present disclosure for facilitating producer sale of goods or services in a multi-channel distribution network consistent with the present disclosure.

FIG. 7 diagrammatically illustrates an system consistent with the present disclosure wherein a product may change form or grade. As shown, distribution network 100*e* may include a producer 700 that may supply bulk product to two consumers 702-1 and 702-2, whereas a third consumer 702-3 requires that the product be packaged, e.g. bagged. The consumers 702-1, 702-2, 702-3 may have indicated a willingness to pay $60, $80 and $100, respectively as indicated in dollar figures adjacent the consumers. The costs of distribution to consumers 702-1 and 702-2 may be $10 and $20, respectively, as indicated adjacent associated distribution channels 704-1 and 704-2. In contrast, the costs of distribution to consumer 702-3 may include the cost ($10 in the illustrated example) of packaging the product at a distribution intermediary 706, e.g. a packaging centers, well as delivery costs along distribution channel 704-3, which includes paths 706-1 from the producer to the distribution intermediary ($10 in the illustrated example) and 706-2 and 704-4 from the distribution intermediary to the consumer for a total effective cost of $30. In the illustrated example, the system may determine that the net price from the producer's 700 perspective is highest for a sale to consumer 702-3 and may present this option to the producer 700 exclusively, or along with a subset or complete set of alternative options, each including the net value (whether defined in terms of cost, timing, quality or some combination thereof) to the producer.

It should also be understood that even if the form of the product does not change, the form of transportation provided by distribution intermediaries may change. For example, a transload station may take skids of product off of a railcar and then load them onto trucks for the next leg of distribution. Similarly, the type of trucks appropriate for moving a product from a producer to a distribution center may be of a different size than those appropriate for retail deliveries. A distribution intermediary may perform and be compensated for these handling functions when a form-of-transportation change occurs, even if a product-form change does not occur.

Figure 8:
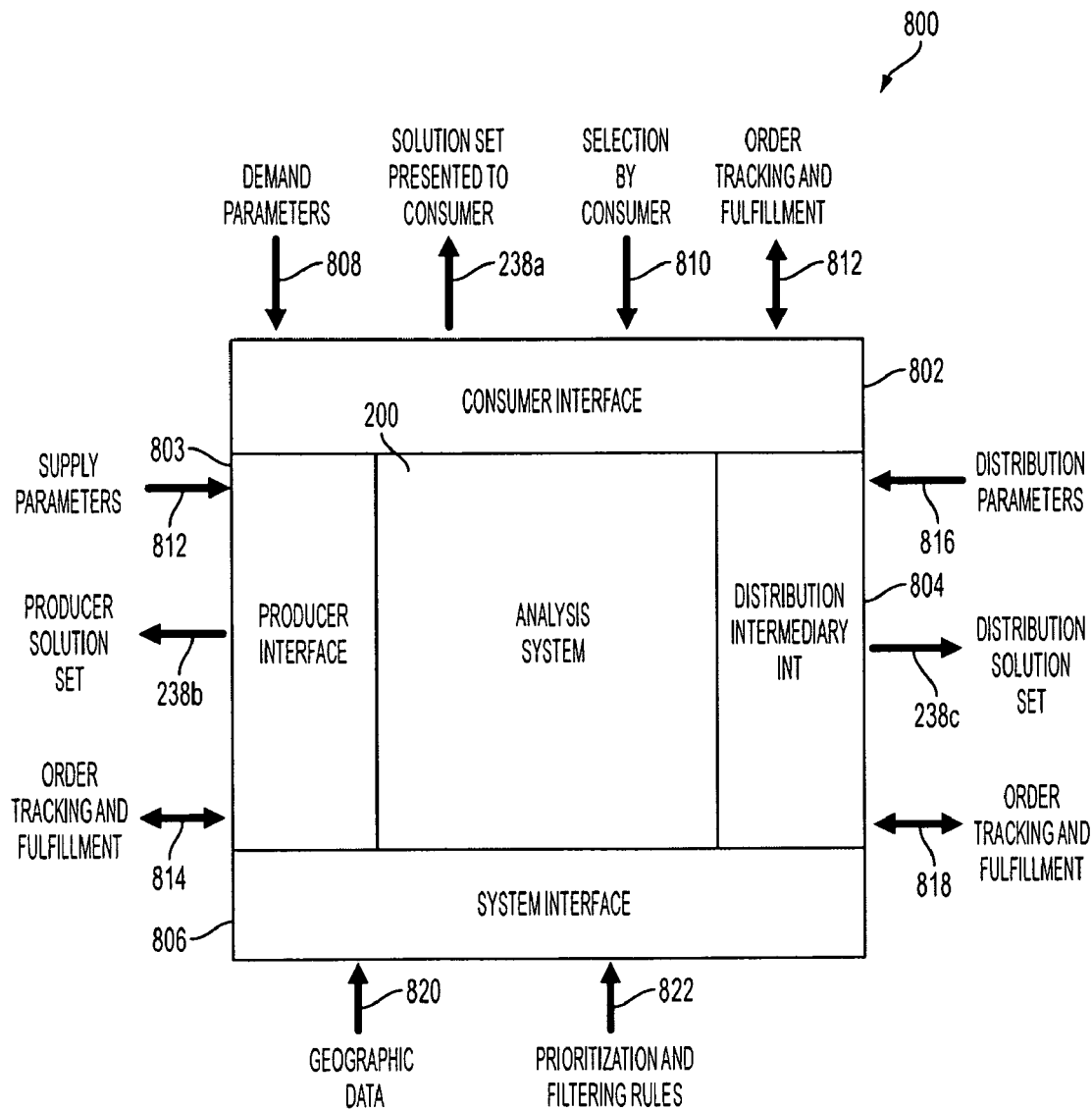
FIG. 8 diagrammatically illustrates a system consistent with the present disclosure.

Turning now to FIG. 8, there is illustrated one exemplary embodiment of system 800 consistent with the present disclosure illustrating various exemplary interfaces, e.g. provided by an analysis tool 130, to an analysis system 200. Although the illustrated exemplary embodiment includes consumer, supplier and distributor interfaces it is to be understood that the system may include only one or more of the interfaces. Also, the specific input/output of the system 200 and the illustrated interfaces may vary from the illustrated exemplary embodiment.

As shown the system 800 may be configured to receive a plurality of inputs, e.g. geographic data 820 and prioritization and filtering rules 822, used by the analysis system 200 to generate solution sets 238*a*, 238*b*, 238*c*. For example, system may provide a consumer interface 802, a producer interface 803, a distribution intermediary interface 804, and a system interface 806. A consumer may submit demand parameters 808, and a solution set 238*a* may be presented to the consumer based on, at least in part, one or more consumer definable criteria and/or parameters. The consumer may input a selection 810 of particular combination of product and delivery services from the interface and the system may interact with the consumer around order fulfillment and tracking 812.

Although the illustration shows these inputs as being directly input into the analysis system by various users of the analysis system, such as consumers, distribution intermediaries, producers and internal system administrators, in some cases it may be preferable to have an internal system administrator enter all or part of the parameters being provided by a producer, consumer or distribution intermediary. For example, this may be the case if a consumer calls and a phone operator enters a consumer's inquiry into the system, or similarly an office staff member may enter producer supply parameters or distribution parameters on behalf of a distribution intermediary.

As used herein, demand parameters 808 may represent broad set of information relating to consumer demand. For example, demand parameters 808 include, but are not limited to: type of demand, which may include: external requests, such as: a consumer request, a reseller request, a commitment to purchase at a fixed price, a commitment to purchase a volume at the best available price, a request for product previously guaranteed to the consumer, an autonomous request based on a level sensor in a storage system, and internal forecasts or virtual requests, such as those based upon heating degree days or weather patterns, historical demand patterns, mailing list data, consumer purchase history, economic data, weather forecasts, historical response rates to quotations, current response rates to quotations; type of product, such as type of materials, classification/certification/grade or quality level, form of product, e.g. bulk solid, bagged solid or liquid, required Storage, cold storage, type of delivery, e.g., the types of trucks that can be accepted or whether rail and/or ship can be accepted; type of consumer, e.g. retail, wholesale or distributor; timing of request, e.g. preference for immediate delivery or at another time; and/or consumer affiliation, e.g. particular consumer groups may be prioritized by the subsequent quoting logic.

The producer interface 803 may allow the producer to pass supply parameters 812 into the system, for example, but not limited to, product supply parameters and the like, which may be used for subsequent analysis by the analysis system As a result of the analysis, a producer solution set 238*b*, e.g. product orders, may be generated and fed back to the producer, for subsequent order tracking and fulfillment 814.

As used herein, supply parameters 812 may represent broad set of information relating to product supply. Examples of supply parameters provided by a producer 812 include, but are not limited to: type of supply, which may include: external supply signals, such as an offer to sell product from a producer, harvester or primary source, an offer to sell product from a distributor or secondary source, a commitment to sell at a fixed price, a commitment to sell a volume at the best available price, an existing agreement to sell under pre-established terms, an electronic signal from a source carrying any of these parameters; internal forecasts of expected supply, such as those based upon prior supply or production patterns, information on producer inventory, heating degree days or weather patterns, historical supply and demand patterns, mailing list data, economic data, time of year or weather forecasts, historical response rates to requests for product, current response rates to requests for product; type of product; type of materials such as classification/certification or quality level, form of product, e.g. bulk solid, bagged solid or liquid; required storage, e.g. cold storage, means of obtaining product, e.g. the types of trucks that can pick up product; type of producer, e.g. regional or national, single facility or multiple location; timing of request, e.g. preference for immediate delivery or sales or at another time; producer affiliation, e.g. particular producer groups may be prioritized by the subsequent quoting logic; and other producer parameters The distributor interface 804 may allow the distributor to provide distribution parameters 816 to the system and to receive a distribution solution set 238c, e.g. requests for distribution services, back from the system. Order fulfillment and tracking 818 can then be carried out by the system.

As used herein, distribution parameters 816 may represent broad set of information relating to distribution. Distribution Parameters 16 may include transportation parameters, distribution intermediary parameters and geographic data. Distribution intermediary parameters may be associated with a geographic location. Transportation parameters may be associated with two points or distances between a starting point and a finishing point for any leg of a trip. Examples of transportation parameters may include: the mode of transport (for example truck, rail, ship, etc.), the routes/paths along roads, rail, water, etc., the type of product(s) transportable, the distances or areas serviced, cost parameters (cost per load, cost per mile, etc.), certification parameters, service parameters (relating to reliability, responsiveness, etc.), etc.

A distribution system and method according to the present disclosure may consider that the mode of transport utilized to deliver a product to a first consumer may differ than that which is appropriate to deliver the product to another consumer or location. Furthermore, the distribution system and method may consider that in a multi-channel distribution network, the mode of transport from a producer to a distribution intermediary may differ from the mode of delivery from the distribution intermediary to the consumer. Additionally, the distribution system and method may consider that the mode of distribution may vary based on the type of product being distributed and the form of the product when it is being distributed. The mode of transport may in other cases be driven by the requested timing of the consumer's request.

Examples of distribution intermediary parameters may, therefore include: the type of services provided, which may include storage of product, handling of product, repackaging of product, inspection of product, transloading of product and other operations on product passing through their system; the physical location of the distribution intermediary, which may include as state, county, city, zip code or street address; the operational location of the distribution intermediary, which may include a distance along a rail line from a terminal, proximity to other facilities, etc; the type of goods handled; the service area of the distribution intermediary, e.g. states or regions served; cost parameters; the type of transportation equipment that may enter or leave the facility; parameters associated with services provided such as packaging costs per unit, storage costs per unit, handling fees per unit, costs for allowing consumers to pick up and other parameters associated with services provided; and other parameters uniquely associated with that distribution intermediary. Examples of geographic data that may be included among the distribution parameters may include: the geographic location of specific points; point-to-point distances (via air, road, straight line or other means); travel times between points; travel costs between points (if previously developed); minimum quantity levels by location; auto-acceptance quantity levels by location; and other geographic data.

FIG. 9 is a screen shot showing one exemplary embodiment 900 of a portion of a consumer interface 802a configured to receive demand parameters 808. A user may be prompted to request a quote 902 and given the opportunity to describe his needs to the system by selecting from one or more menus (such as, but not limited to, drop-down menus or the like) or input fields. For example, the fields may be provided to allow the user to enter a particular type of good 904, the quantity needed 906, the desired delivery 908, the consumer's geographic location 910, the type of referral 912 and a referral or affiliation code 914. The referral or affiliation code 914 may be used for a variety of purposes, which may include allowing that demand signal to be aggregated with other affiliates, allowing that order to be prioritized or filtered differently, affording discounts, or for other uses. The interface may present a button 916 for actuation by a consumer to obtain a quote on the goods, which in the illustrated exemplary embodiment are wood pellets used as a heating fuel.

FIG. 10 is a screen shot illustrating one exemplary embodiment 1000 of a portion of a consumer interface 802a for providing a consumer with a solution set 238a. The solution set may be analyzed for a particular location 1002, which in this example shows the zip code for this particular set of options. The set of options may be analyzed for a state, county, region, street address, latitude and longitude pair or any other means of identifying a geographic location. In response to request for a quote from a consumer, the distribution system and method may present a solution set including, each of one or more product options 1012, the type of product 1003, the brand 1004, the quantity available for purchase 1005, the schedule for providing the product 1006, the cost of the product 1007, the delivery charges 1008, localized taxes 1009, and/or the total amount due 1010. In one embodiment, the set of options may include a button or link 1011 that allows the consumer to purchase a selected one of the products from the product options 1012 and the associated delivery services.

The presented options may vary depending on geographic location, e.g. a consumer making a request in one geographic location may see different results, e.g. a different set of producers and/or a different set of products or services, than a consumer in another geographic location. In addition, though the user may have requested a particular quantity of product, the distribution system and method may respond with alternative quantity suggestions as discussed below. In the illustrated example, the consumer requested 2 tons, and the system presented a solution set including 2, 2.4, 4, 4.8 and 8 tons, based on the available materials in the area, e.g. as determined from supply parameters provided through a producer interface. A system and method consistent with the present disclosure may provide other alternatives associated with the demand parameters provided by the consumer including, but not limited to, alternative types of product and/or brands as well as alternative schedule parameters.

For example, a consumer requesting the product "Wood Pellets (Premium)" may also be presented with options for the product "Wood Pellets (Super-Premium)" or even alternative goods such as "Clean Dry Corn Fuel". A consumer requesting a specific product or brand may be presented multiple brands. A consumer requesting immediate delivery may be quoted "Late Summer/Early Fall" or quoted "Fall Delivery" at potentially a different price. Additionally, the distribution system and method may also include a link or button that allows a consumer to check availability of a product and/or delivery service, when the ability to supply is not known instantaneously. In one embodiment, this information may be fed back to a central database where a consumer service team may act on the inquiry and respond to the consumer at a later date.

FIG. 11 is a screen shot illustrating another exemplary embodiment 1100 of a portion of a consumer interface 802a for providing a consumer with a solution set 238a. For example, the interface application may provide options for pickup 1102 and options for delivery 1103, as part of the same solution set presented to the consumer. Options for buying early 1104 may also be displayed along with options for buying early and taking delivery at a later date 1105.

FIG. 12 is a screen shot illustrating another exemplary embodiment 1200 of a portion of a consumer interface 802a for providing a consumer with a solution set 238a. As shown, the set of options may be grouped according to marketing categories such as, but not limited to, exclusive listings 1201, commercial affiliates 1202 and Promotional Affiliates 1203. The type of transport to be utilized 1204 may also be included, along with other supply, demand and distribution parameters, for review and selection by the consumer.

The types of information that may be presented as part of a solution set 238a presented to a consumer may include any appropriate elements of the demand parameters 808, the supply parameters 812, the distribution parameters 816 and other relevant parameters such as data associated with prioritization and filtering rules 822. The data presented in the illustrated exemplary embodiments a provided by way of illustration only. Additional and/or different parameters may be appropriate for display depending on the implementations and/or applications.

FIG. 13 diagrammatically illustrates an exemplary embodiment 1300 of a portion of a distributor interface 804a for receiving distribution parameters 816 from a transportation provider, and FIG. 14 diagrammatically illustrates an exemplary embodiment 1400 of a portion of a distributor interface 804a for receiving distribution parameters 816 from a distribution center. FIG. 15 diagrammatically illustrates an exemplary embodiment 1500 of a portion of a producer interface 803a for receiving supply parameters 812 from producer.

In FIGS. 13 to 15, the data in the boxes may represent a user's input to the system. For example, as shown in FIG. 13, a distributor interface may provide one or more screens whereby a transportation provider may update a specific subset of the transportation parameters associated with that carrier, such as their pricing parameters. Similarly, as shown in FIG. 14, a distribution center may be able to update a set of distribution parameters associated with the distribution center. As shown FIG. 15, a producer may also have an interface into the system which allows him to supply parameters 812

According to one embodiment of the present disclosure, the interfaces discussed herein may be configured such that a user may manually enter the parameters discussed herein. However, the interfaces may be configured to automatically receive data through electronic data interchange. A system and method according to the present disclosure may allow each party within the overall transaction to individually update their own parameters, and/or may substantially continually refine and update the set of options which may be provided on an automatic and ongoing basis.

Figure 16:
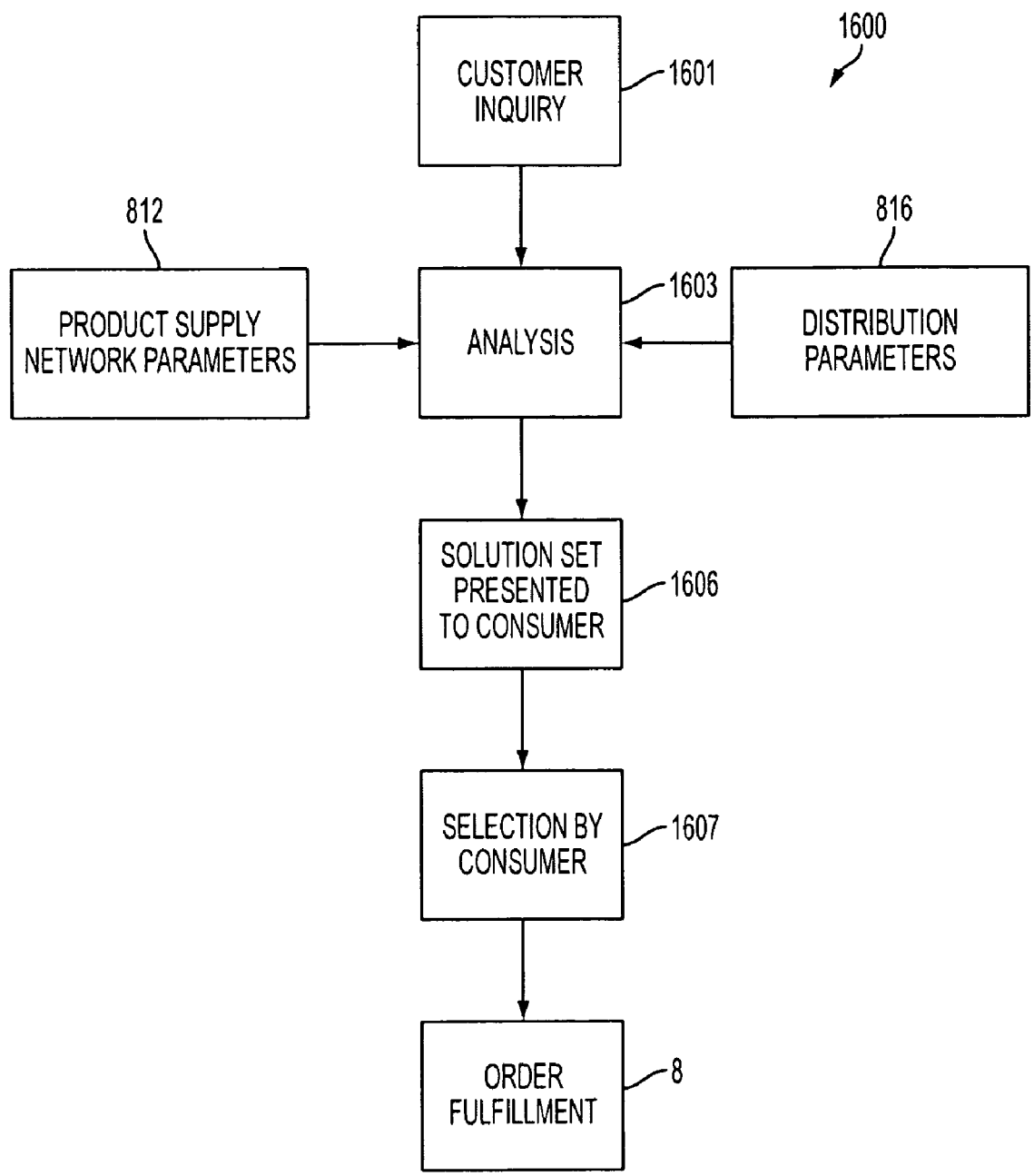
FIG. 16 is a block flow diagram illustrating an exemplary consumer transaction consistent with the present disclosure.

FIG. 16 is a block flow diagram of one exemplary embodiment 1600 of a method consistent to be performed by an analysis system consistent with the present disclosure in which a consumer inquiry may drive the delivery of a solution set review and selection by the consumer. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In FIG. 16, a consumer inquiry 1601 may be generated and entered into the system, for example, through a consumer interface 802. The analysis system 200 may perform an analysis 1603 of that inquiry, based on, at least in part, one or more of a set of supply parameters 812 and distribution parameters 816. As a result of that analysis, a solution set including options for purchasing product through a plurality of at least partially separate distribution channels in a multi-channel distribution network may be presented 1606 to the consumer. The consumer may select 1607 one or more of these options, and then the order would proceed to the order fulfillment phase 1608.

Figure 17:
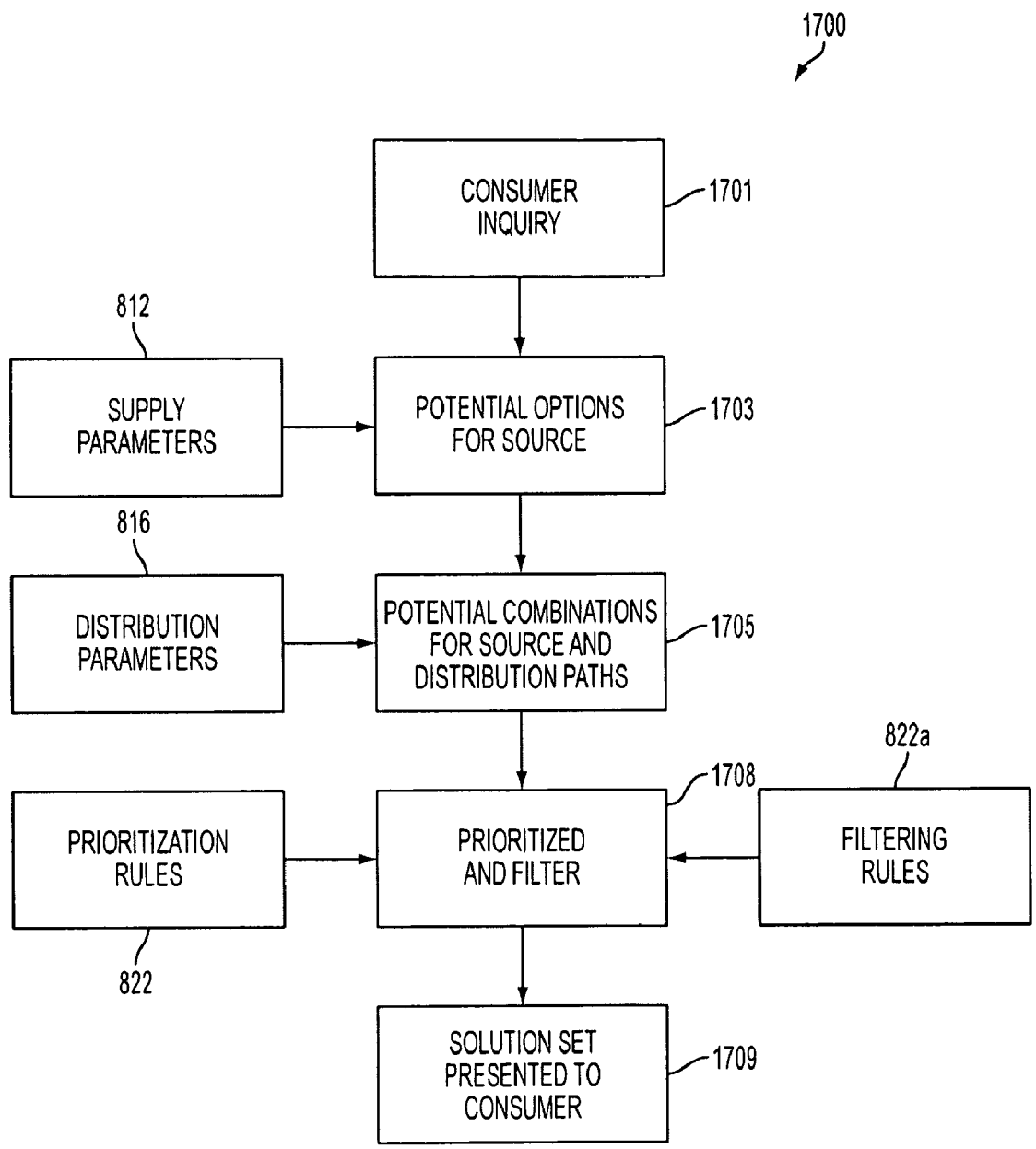
FIG. 17 is a block flow diagram illustrating another exemplary consumer transaction consistent with the present disclosure.

One method 1700 and system for conducting the analysis, e.g. in an analysis system 200, as described above is shown in FIG. 17 in a block flow form. In this example, a consumer inquiry 1701 may be compared with a set of supply parameters 812 to generate a set of potential options 1703 for the source of the product forming the basis of the consumer inquiry. In one example, a consumer may request a delivery of a product and supply parameters may be used to select potential sources of the product within a 100 mile radius of the consumer's location.

Distribution parameters 816 may be used to trace at least one distribution channel from each source of the product to the desired delivery location to generate a set of potential combinations for source and distribution channels 1705. This may include, for example, examining potential routes from each source to the consumer's location, potentially including multiple potential travel channels between a single source and the consumer.

Optionally, the potential combinations for source and distribution channels may be prioritized and filtered 1708 based on, at least in part, one or more prioritization rules 822 and/or filtering rules 822a. In one example, the prioritization rules 822 may be used to determine the lowest cost channel for each source, and then to choose a set of sources providing the lowest total delivered cost solutions. In another example, the prioritization rules 822 may be used to determine the shortest delivery time. The consumer inquiry 1701 may contain demand parameters 808 used prioritize or filter the responses as well, such as the consumer identifying his own priorities such as "lowest cost" or "fastest time". In other cases, it may not be necessary to prioritize or filter results at all, and advisable merely to present all options to the consumer.

Figure 18:
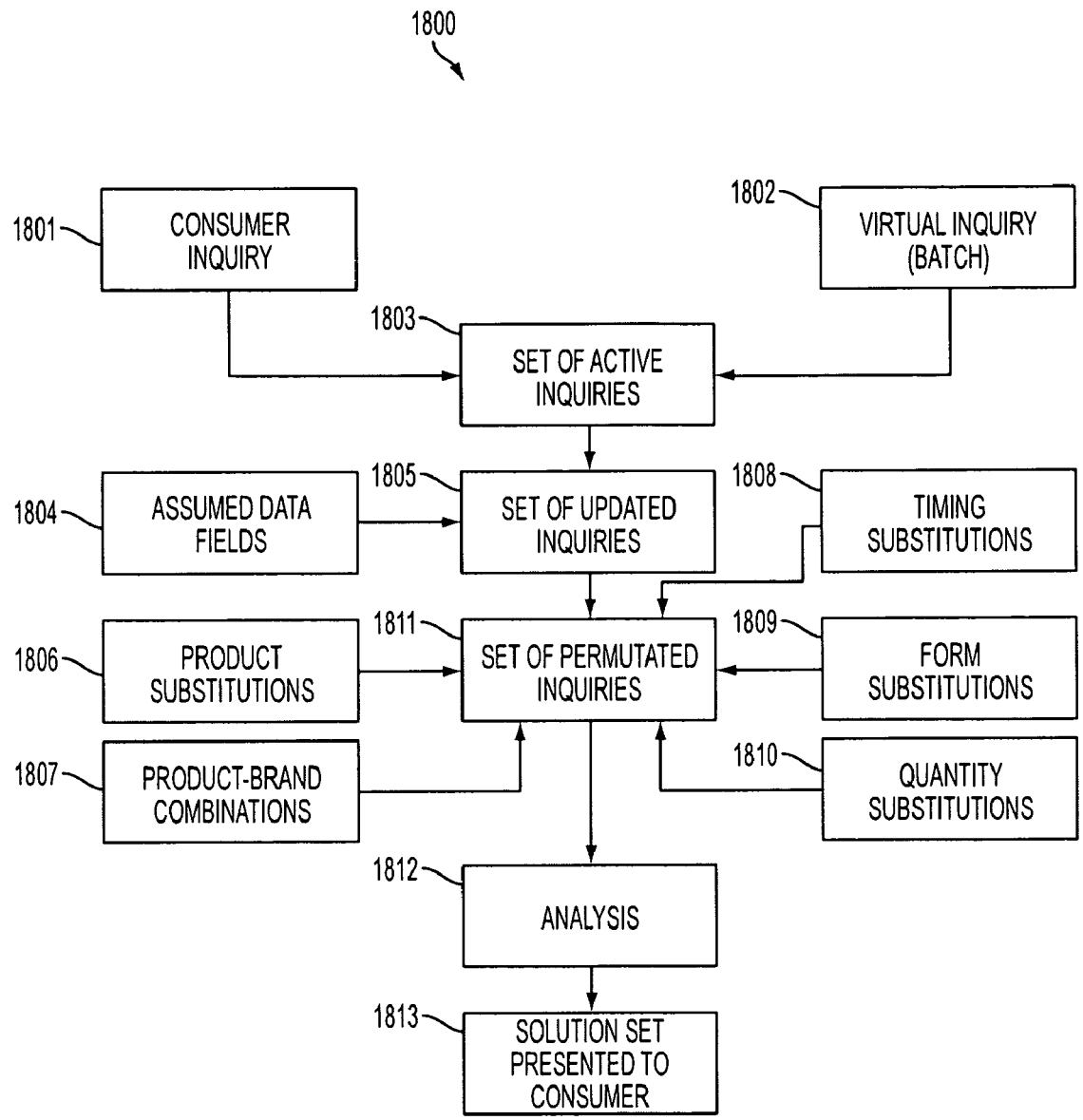
FIG. 18 is a block flow diagram illustrating another exemplary consumer transaction consistent with the present disclosure.

The system and method according to the present disclosure may then generate 1709 a solution set including options for purchasing product through a plurality of at least partially separate distribution channels in a multi-channel distribution network for presentation to the consumer. This presentation may be a visual display on a web interface, or in some cases may be an electronic transfer of information to a prospective or committed buyer. In one embodiment, the solution set options presented to the consumer may be issued as an e-mail including an actionable purchase button allowing the consumer to make a purchase associated with one of the options Referring to FIG. 18, one embodiment of an analysis system consistent with the present disclosure is illustrated in block flow form in which a set of options may be presented to a consumer is based on, at least in part, information that is not input directly by a potential consumer. For example, a consumer inquiry may be generated by an actual consumer inquiry 1801, or a virtual inquiry 1802 may be created as part of a batch of inquiries generated by an autonomous process. An example of such a batch input may include taking a mailing list with names and zip codes and creating an inquiry on behalf of potential consumers who have not submitted an inquiry themselves, e.g. using their names and zip codes. Real and virtual inquiries may be combined into one set of active inquiries 1803. Optionally, a data set including assumed data fields 1804 may be combined with the set of active inquiries 1803 to generate a set of updated inquiries 1805. For example, to continue with the batch mailing list example above, in generating a set of updated inquiries 18055, a quantity or type of product that is desired may be assumed. For example, if the mailing list was based on buyers of wood stoves, the type of product assumed could be assumed to be wood, and the quantity could be assumed to be one cord of wood.

The set of updated inquiries 1805 may be permutated to generate a set of permutated inquiries 1811, which may then be submitted for analysis as if each were an individual consumer inquiry. For example, the permutated inquiries 1811 may be generated based on a variety of factors depending on the specific application including, but not limited to, product substitutions 1806, product-brand combinations 1807, timing substitutions 1808, form substitutions 1809, or quantity substitutions 1810. By way of example, the set of permutated inquires 1811 may be generated based on a product substitution 1806 by submitting a request for at least one other product type in response to a consumer requesting a specific type of product. For example, if a consumer requested premium wood pellets for a heating application, the distribution system and method may be configured to also submit a request for standard wood pellets. Such a request may be configured to convert all premium wood pellet inquiries to requests for standard wood pellets, to initiate quotes on both types any time either is requested, or generally to suggest another product in response to a given goods request.

An example of a product-brand combination 1807 which may be utilized to generate the set of permutated inquires 1811 may include generating requests for three different brands of product in response to a request for one or more specific types or brands of product. An example of a timing substitution 1808 which may be utilized to generate the set of permutated inquires 1811 may include offering more than one option for the timing of delivery, such as "Expedited", "1-2 weeks", "2-4 weeks" and so on. An example of a form substitution 1809 which may be utilized to generate the set of permutated inquires 1811 may include offering bulk product in response to a request for bagged product. An example of a quantity substitution 10 which may be utilized to generate the set of permutated inquires 1811 may include "upsize" requests, e.g., creating a request for 4 tons of product simultaneously with each request for 2 tons of product. It should be understood that pricing of different combinations of these parameters may be varied. Specifically with reference to timing options, the pricing offered to a producer or a consumer may be varied according to a fixed schedule, or with reference to an external index, such as a Consumer Price Index or publicly available commodities index.

The examples of how the set of permutated inquires 1811 may be generated based on the various factors discussed above are not intended to be limiting and other factors may be utilized depending on the intended application. For example, any number of parameters associated with the consumer inquiry may also be used. In addition, it may also be advisable to limit certain types of permutation to acceptable combinations of parameters. For example, one may limit the list of brands associated with a particular product to an appropriate set. It may also be beneficial to permutate customer preference relating to distribution parameters, to generate requests for product delivered by various modes, such as by truck, railcar or other means, or to generate requests for product delivered using a specific class of vehicle or specific affiliated delivery service provider.

Figure 19:
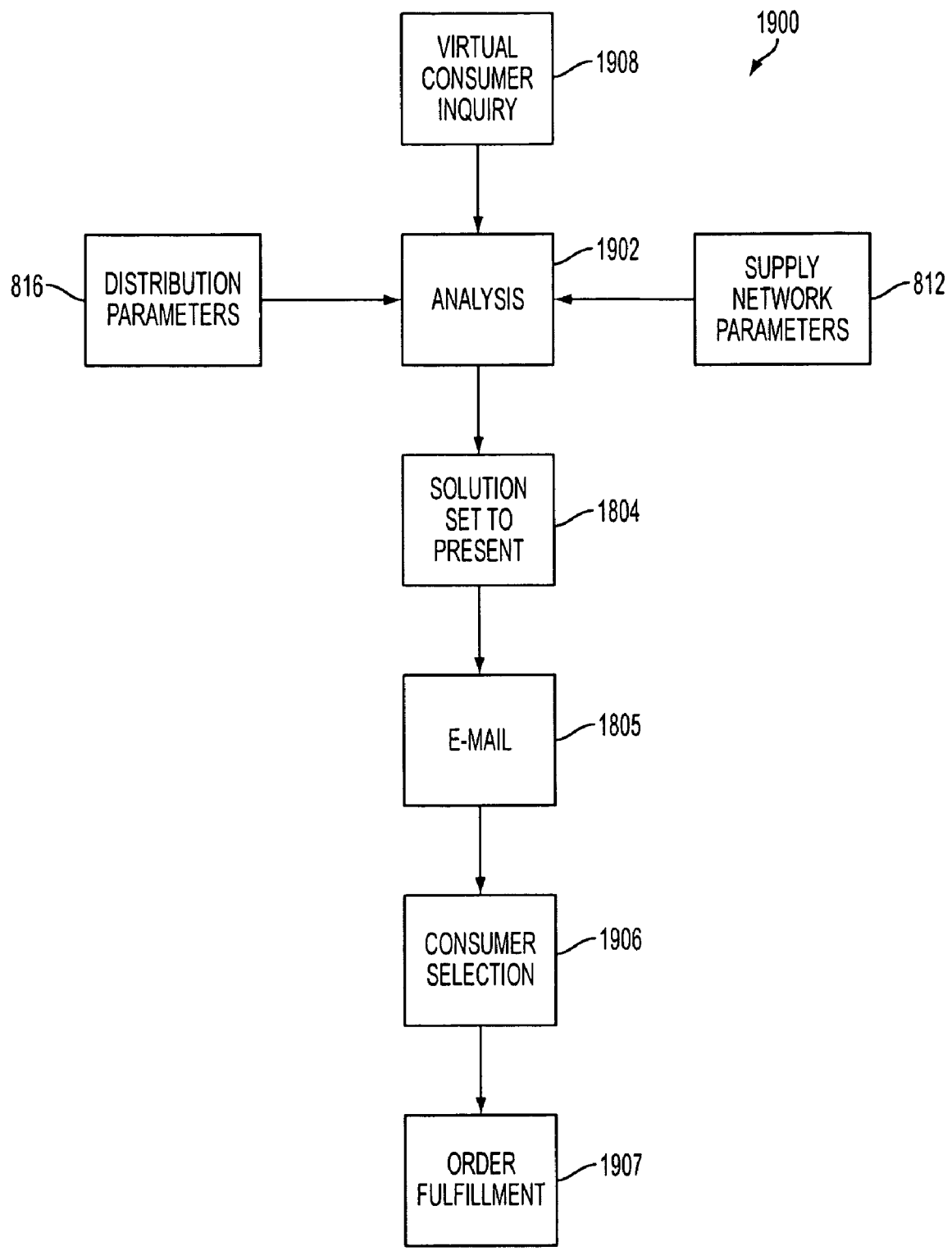
FIG. 19 is a block flow diagram illustrating another exemplary consumer transaction consistent with the present disclosure.

Referring now to FIG. 19, one embodiment 1900 of an analysis system and method consistent with the present disclosure is shown in block flow form wherein a consumer inquiry is not prompted by a consumer's action or presented via a web interface (if no request has been made through such an interface). Instead, a virtual inquiry 1908 may be generated as described above, for example, based on a mailing list with other assumed data fields provided. At least one solution set may be generated 1902, based on, at least in part, distribution parameters 816 and supply parameters 812, and the set of options may be presented to the consumer. For example, these options may be presented to the consumer via an e-mail to the consumer 1905. The e-mail sent to the consumer may include a link back into the web application to facilitate order processing. The options may also or alternatively be presented to the consumer via mail and/or communicated to the consumer via phone or by other methods. After selection of an option by the consumer 1906, the system and method may optionally proceed to order fulfillment 1907.

Figure 20:
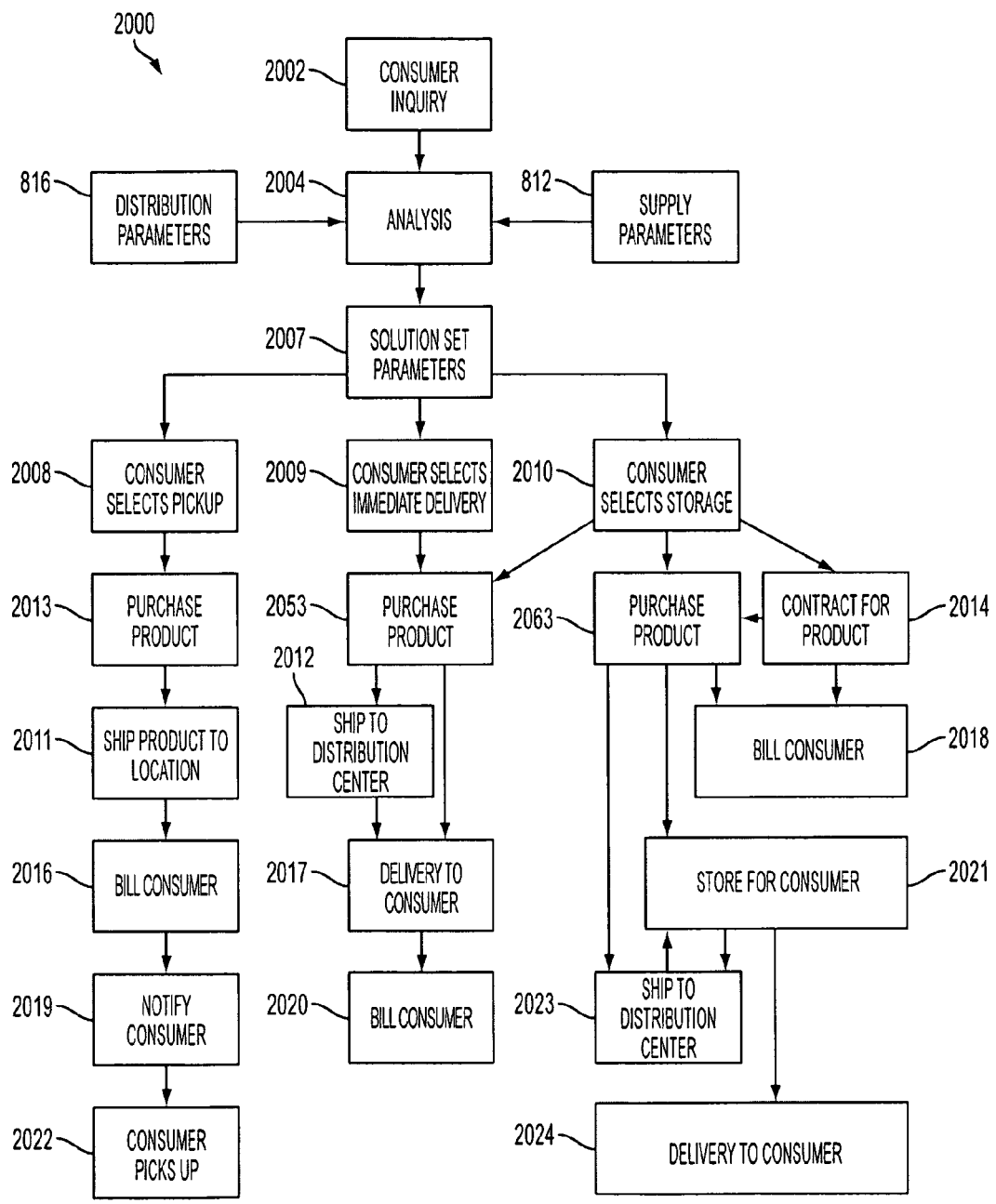
FIG. 20 is a block flow diagram illustrating another exemplary consumer transaction consistent with the present disclosure.

FIG. 20 illustrates one embodiment 2000 of an analysis method consistent with the present disclosure. In the illustrated exemplary embodiment, product may be delivered to the consumer via consumer pickup, via immediate delivery, or after storage on behalf of the consumer. Information on the storage location price and delivery may be included in distribution network parameters 816, along with information on the pickup location price and availability. In response to a consumer inquiry 2002 these are analyzed 2004 along with supply parameters 812 and a solution set is presented 2007.

The consumer may then select pickup 2008, immediate delivery 2009 or storage 2010. If the consumer selects a pick-up option 2008, the consumer may make a purchase 2013, the product may be shipped to the pick-up location 2011, the consumer may be billed 2019 and notified 2019 of the delivery. The consumer may then pick-up 2022 the product at the designated location. If the consumer selects immediate delivery 2009, the consumer may make a purchase from the solution set 2053, the product may be shipped to the consumer 2017, optionally through a distribution center 2012, and the consumer may be billed 2020.

If the consumer selects a storage option 2010, the consumer may make a purchase 2053 and the product may be shipped to a distribution center 2012 before being shipped the consumer 2017. Alternatively, the consumer may purchase the product, the product may be stored for the consumer, e.g. at a distribution center, and the consumer may be billed before delivery of the product to the consumer. Alternatively, the consumer may make a contract for future purchase of the product 2014, before purchase 2063 and billing 2018. The analysis may encompass these various options, along with other potential options and present them to the consumer.

FIGS. 21A, 21B and 21C diagrammatically illustrate one example of how quantity presented to the consumer may be a function of the quantity requested and other distribution parameters 816. In the illustrated exemplary embodiment, the distribution parameters may be designed to set regional minimum and auto-acceptance quantities based on a request's location. Requests coming in for product may be at various quantity levels, as shown in FIG. 21A. Large circles 2100 may indicate requests for truckloads of product; small circles 2102 may represent requests for individual bags of product, as an example. FIG. 21B illustrate how regional minimum and auto-acceptance quantities may be implemented. Various regions 2104, 2106, 2108 on the map have associated minimum and auto-acceptance quantities For example, for a source with location within region 2104 single bags of product may be delivered, but for a request within region 2016 only full truckloads may be delivered. FIG. 21C illustrates quantity requests from FIG. 21A overlayed on the regions of FIG. 21B.

It should be understood that the minimum and auto-acceptance quantities described here may be generated on a dynamic basis. Patterns of demand dynamics may be used to update these minimum and auto-acceptance quantities, which may be driven in part by actual pending orders in the system, trends in ordering patterns or forecasted ordering patterns based on a variety of factors such as population density, seasonal factors or weather patterns. It should also be understood that as an alternative to setting minimums and auto-acceptance quantities by region to filter orders being accepted in a given area, pricing mechanisms may also be employed. For example, in areas of high demand density, pricing to a consumer for product and delivery may be lower than in areas of low demand density. In this manner, the system maintains the ability of the producer or distributor to avoid unprofitable distribution, without setting hard minimum delivery quantities.

The auto-acceptance criteria for each region 2104, 2106, 2108 may be different from minimums. For example, a minimum quantity may represent the smallest quantity that may be delivered to a location within a region under any circumstances whereas an auto-acceptance quantity may represent a quantity above which any orders received by the system will be automatically accepted. There may be a gap or difference between the auto-acceptance quantity and the minimums in which other factors may be used to determine if a request is quoted or an order is accepted as discussed below. For example, if the minimum delivery to an region is one ton of product and the auto-acceptance level is five tons, a request for 3 tons may not be automatically rejected or accepted by the system, and may be considered on the basis of other orders in the area or after review by an appropriate team member.

Figure 22:
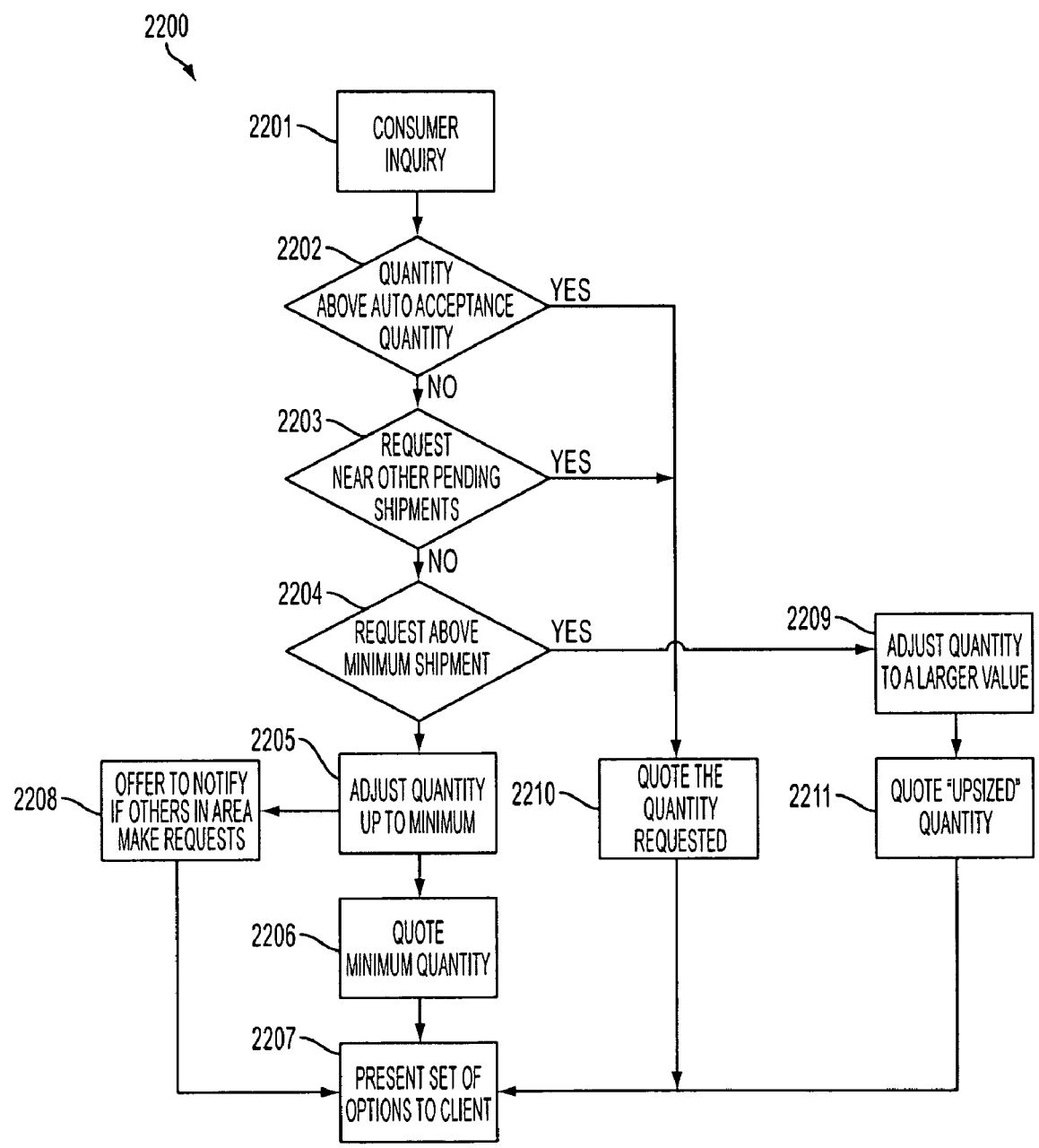
FIG. 22 is a block flow diagram illustrating another exemplary consumer transaction consistent with the present disclosure.

Referring now to FIG. 22, one embodiment 2200 method consistent with the present disclosure is shown in block flow form utilizing the minimum quantity and auto-acceptance quantity parameters. A consumer inquiry 2201 may be received and compared 2202 against and auto acceptance quantity. If the consumer inquiry is above the auto acceptance quantity, then the system may quote the quantity requested 2210. If not, the consumer inquiry may be analyzed 2203 to determine if the consumer inquiry is geographically near other pending shipments. If the consumer inquiry is geographically near other pending shipments, then the system may still quote the quantity requested 2210.

If the consumer inquiry is not above the auto-acceptance quantity and is not geographically near other pending shipments, the consumer inquiry may be compared 2204 against a minimum quantity parameter to determine if the consumer inquiry is above the minimum quantity. If the consumer inquiry is above the minimum quantity, the system may adjust quantity to a larger value 2209, and the quote 2211 "Upsized" quantity. If the consumer inquiry is not above the minimum quantity, the system may adjust 2205 the quantity up to the minimum quantity, quote the minimum quantity 2206, and present a solution set of options 2207 to the consumer based on the minimum quantity. Optionally, if consumer inquiry is below the minimum, the system may offer to notify 2208 the consumer if others in the area make similar requests, and the economics of delivering to that location may thereby improve. Combinations of these channels may also be appropriate in some instances. For example, the system may offer notification if others in the area also request product allowing a smaller delivery, while simultaneously quoting a larger quantity.

Figure 23:
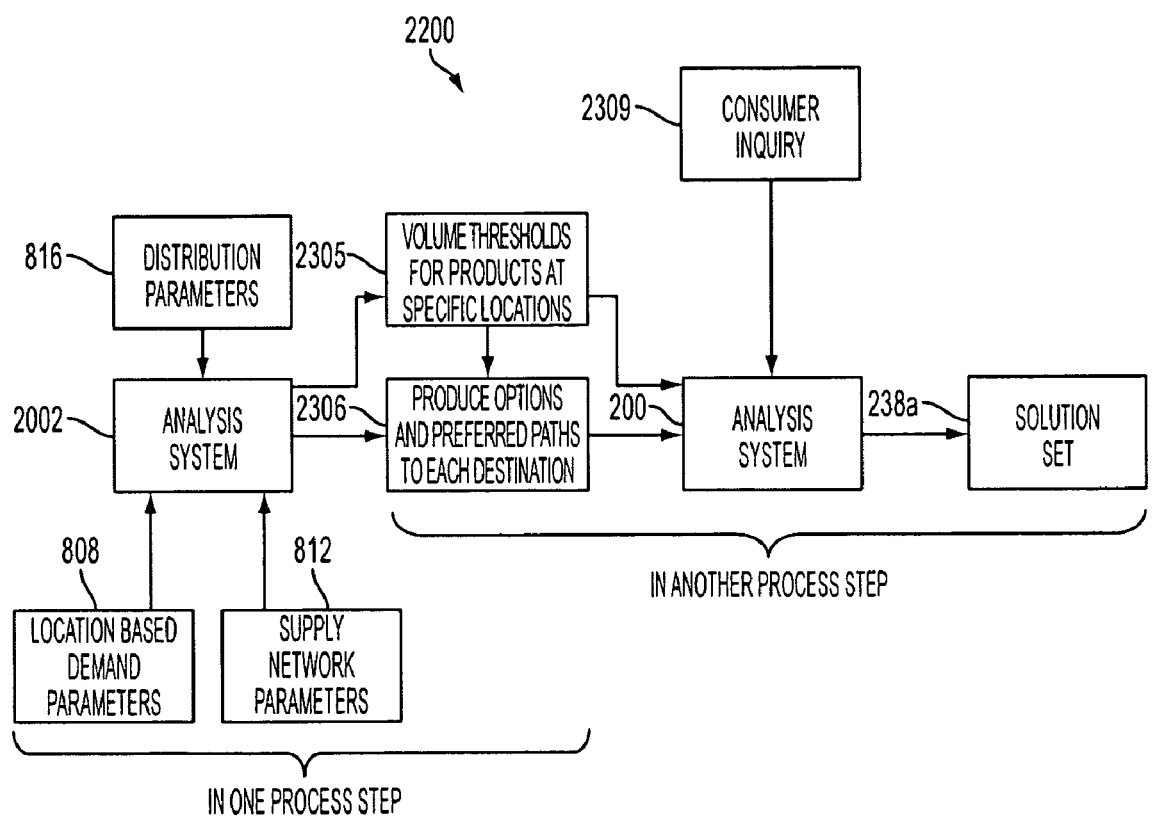
FIG. 23 is a block flow diagram illustrating another exemplary consumer transaction consistent with the present disclosure.

FIG. 23 shows one embodiment 2300 of how the timing of the development of volume thresholds may differ from the timing of response to consumer inquiries. For example, location-based demand parameters 808 may be received as an input at analysis system 200, along with distribution parameters 816 and supply parameters 812. The output of the analysis may include volume thresholds for goods at specific locations 2305 and/or producer options and preferred distribution channels to each destination 2306. These preferred distribution channels may be the channels in the multi-channel distribution network providing the lowest cost route or the shortest time route between a given producer and a specific destination, and may include information on that channel such as the route, the time required, the distribution costs, distribution intermediaries that may be involved and so on. These analyses may be conducted in a single process step, for example in an off-line analysis conducted once a week. Analysis system 200 may generate a solution set 238a based on the consumer inquiry 2309, the volume thresholds 2305 and preferred channels 2306

Figure 24:
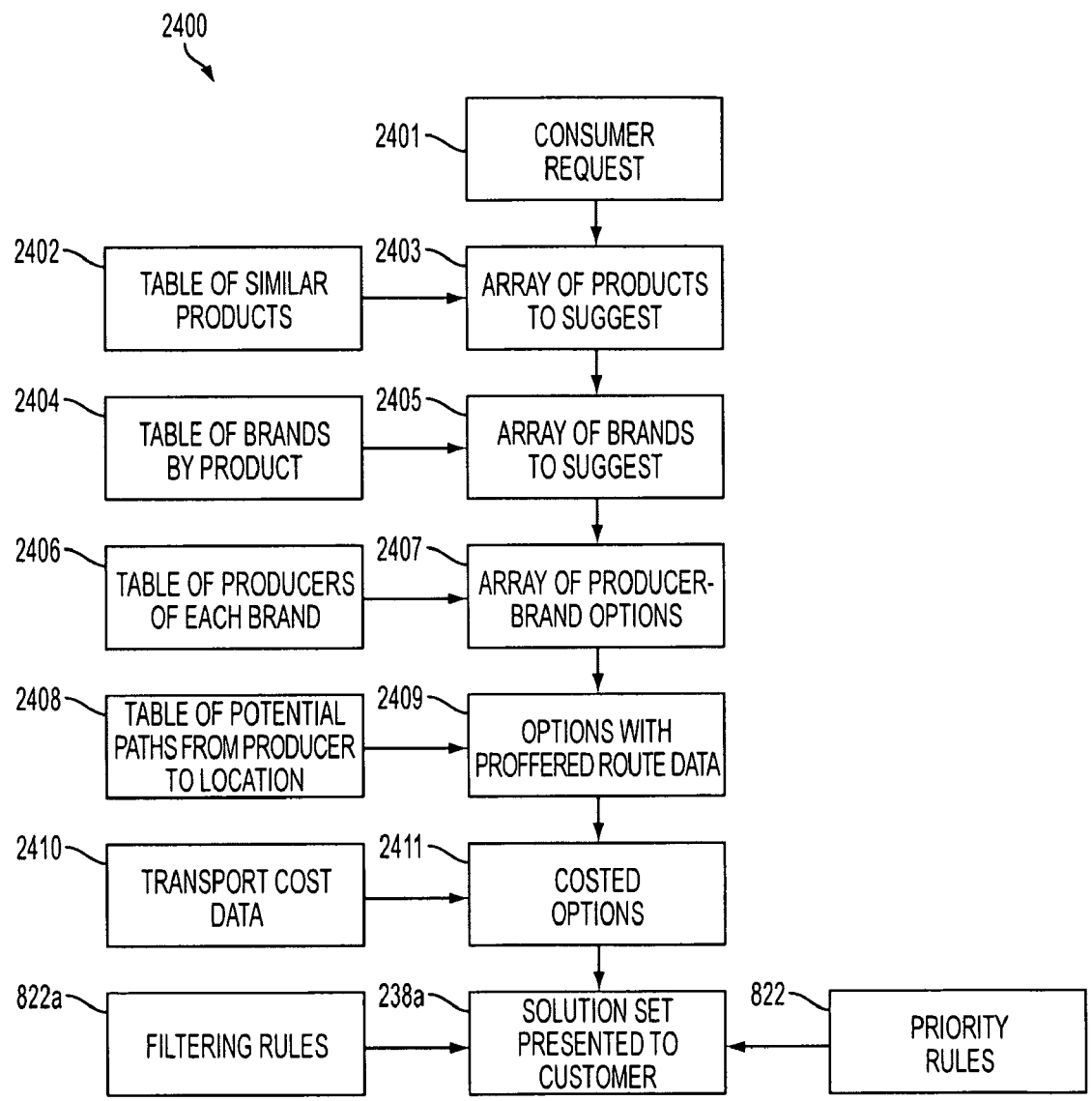
FIG. 24 is a block flow diagram illustrating another exemplary consumer transaction consistent with the present disclosure.

FIG. 24 is a block flow sequence of generating a solution set in response to a consumer inquiry 2401. A table of similar goods 2402 based on the product requested by the consumer may be used to create an array of goods to suggest 2403. A table of brands by product 2404 may then be used to generate an array of brands to suggest 2405. A table of producers for each brand 2406 may be used to generate an array of producer-brand options 2407, which contains combinations of goods, sources and brands that may be associated with the original request, or some subset. Then a table of potential channels for source to location 2408, or other geographic reference data, such as accessing or querying external geographic or mapping databases, may be used to create a set of options with preferred route data 2409. Transportation cost data 2410 may be used to develop a set of costed options 2411, which may also use product cost data obtained from the product sources, or through the supply parameters. Finally, a set of filtering rules 822a and/or priority rules 822 may be used to refine the a solution set 238a presented to consumer.

Figure 25:
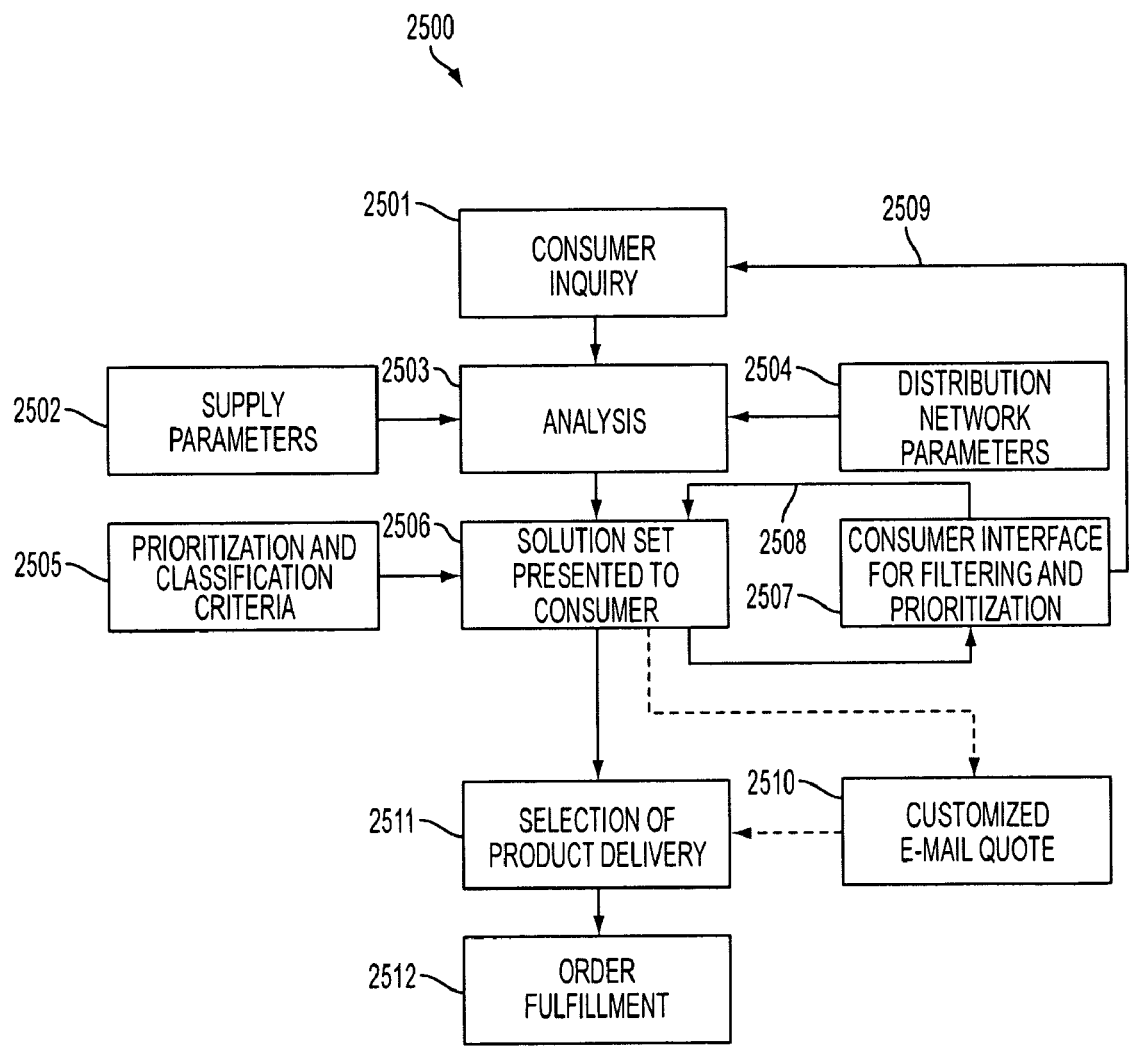
FIG. 25 is a block flow diagram illustrating another exemplary consumer transaction consistent with the present disclosure.

A method consistent with the present disclosure may also or alternatively include an iterative process for generating a solution set or set of options. One embodiment 2500 of such a method is shown in FIG. 25. A solution set or set of options 2506 a solution set including options for purchasing product through a plurality of at least partially separate distribution channels in a multi-channel distribution network may be generated in accordance with any of the embodiments described herein. For example, a consumer inquiry 2501 may be generated and entered into the system, for example, through a consumer interface 802. The analysis system 200 may perform an analysis 2503 of that inquiry, based on, at least in part, one or more of a set of supply parameters 812 and distribution parameters 816.

The consumer interface 802 may be configured to allow the user to input his or her own sorting and/or filtering criteria and to further refine the solution set 2506 using demand parameters 808 According to another embodiment, consumer interface 802 may be configured to generate a new consumer inquiry as (illustrated by arrow 2509) which may be used to generate a new solution set. The sorting and/or filtering may continue until the consumer is satisfied and proceeds to selection of product and delivery 2511 and order fulfillment 2512, or a quote may be sent without being requested (e.g., a confirming e-mail showing a customized e-mail quote 2510 which may contain elements of the solution set presented to the consumer).

While the embodiments described above may be directed to the benefit of a consumer, the present disclosure may also be used by a producer for the benefit of a producer, or by a distributor for the benefit of a distributor. While some of the embodiments described herein may continue to use a consumer inquiry as an example, such systems and methods may also be equally applied for the benefit of a producer or distributor. Also, while the embodiments described herein may be described in the context of a transaction between a user and a producer, the present disclosure may also be used in the context of an auction. For example, a consumer or a group of consumers could use this analysis system to conduct an auction whereby producers and/or distribution intermediaries are bidding competitively for the right to supply to that consumer. Similarly, a producer or group of producers could use this analysis system to conduct an auction whereby consumers and/or distribution intermediaries are competitively bidding for the opportunity to buy product and/or services. Finally, a distribution intermediary may conduct auctions whereby consumers and/or producers are competitively bidding for product contracts and distribution services. It should be understood that such auctions may be conducted as forward auctions, reverse auctions, dutch auctions and other auction formats.

Figure 26:
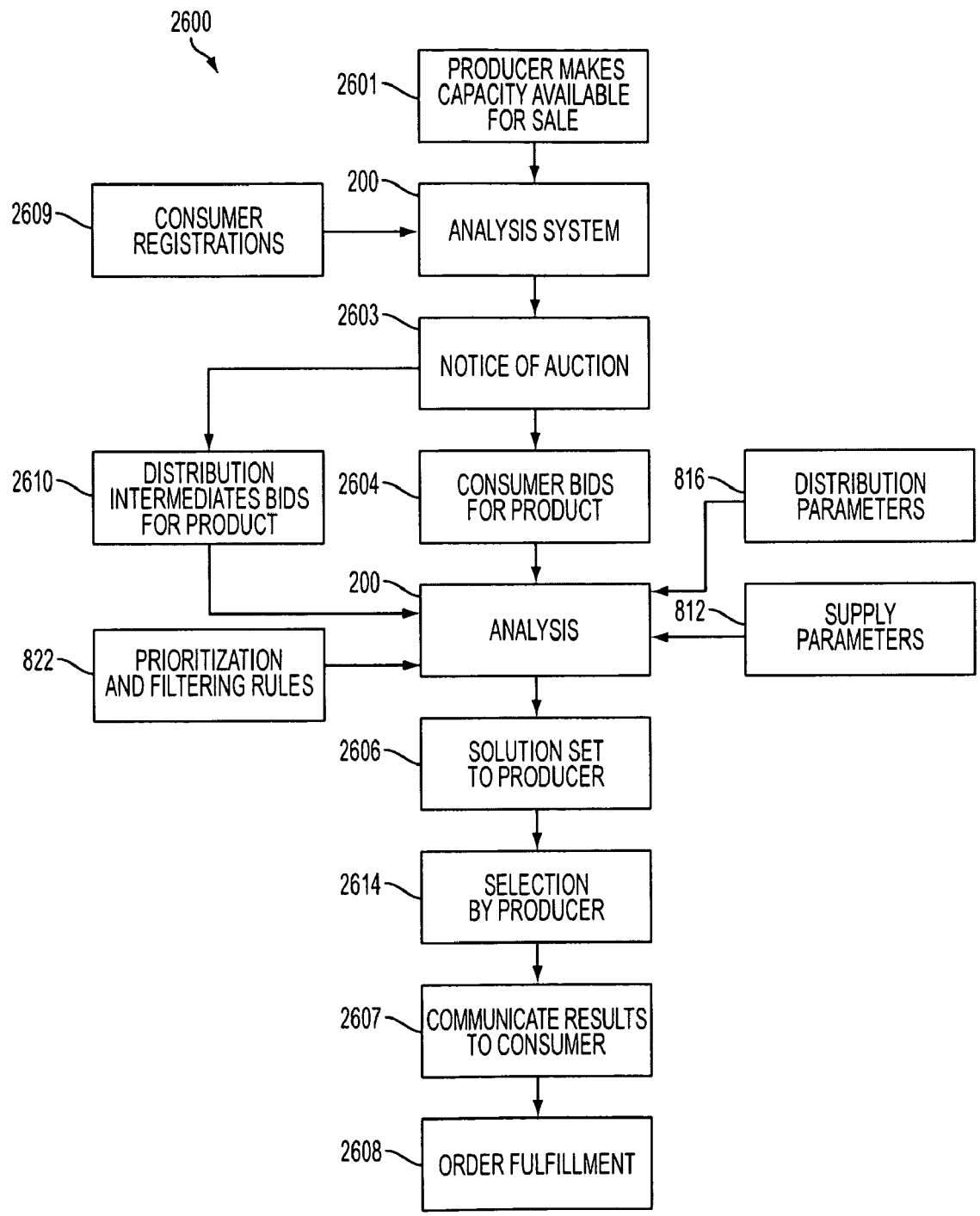
FIG. 26 is a block flow diagram illustrating an exemplary producer transaction consistent with the present disclosure.

FIG. 26 illustrates one embodiment 2600 of method in block flow form for the benefit of a producer. In the illustrated embodiment, the producer may provide supply data regarding its capacity available for sale 2601 and analysis system 200 that may have access to stored pre-existing consumer registrations 2609 or that may then solicit consumer registrations. The system may issue a notice of auction 2603 to registered consumers and solicit redistributor bids for product 2610 and consumer bids for product 2604. The consumer bids 2604 may then be combined with distribution parameters 816 and supply parameters 812 by analysis system 200 to generate an initial solution set of options that may be filtered according to prioritization and filtering rules 822 to generate a solution set 238*b* for presentation to producer. The producer may select 2614 from at least one of the options within the solution set and the supplier's selection may be communicated 2607 to the consumers and the order may be processed 2608.

Figure 27:
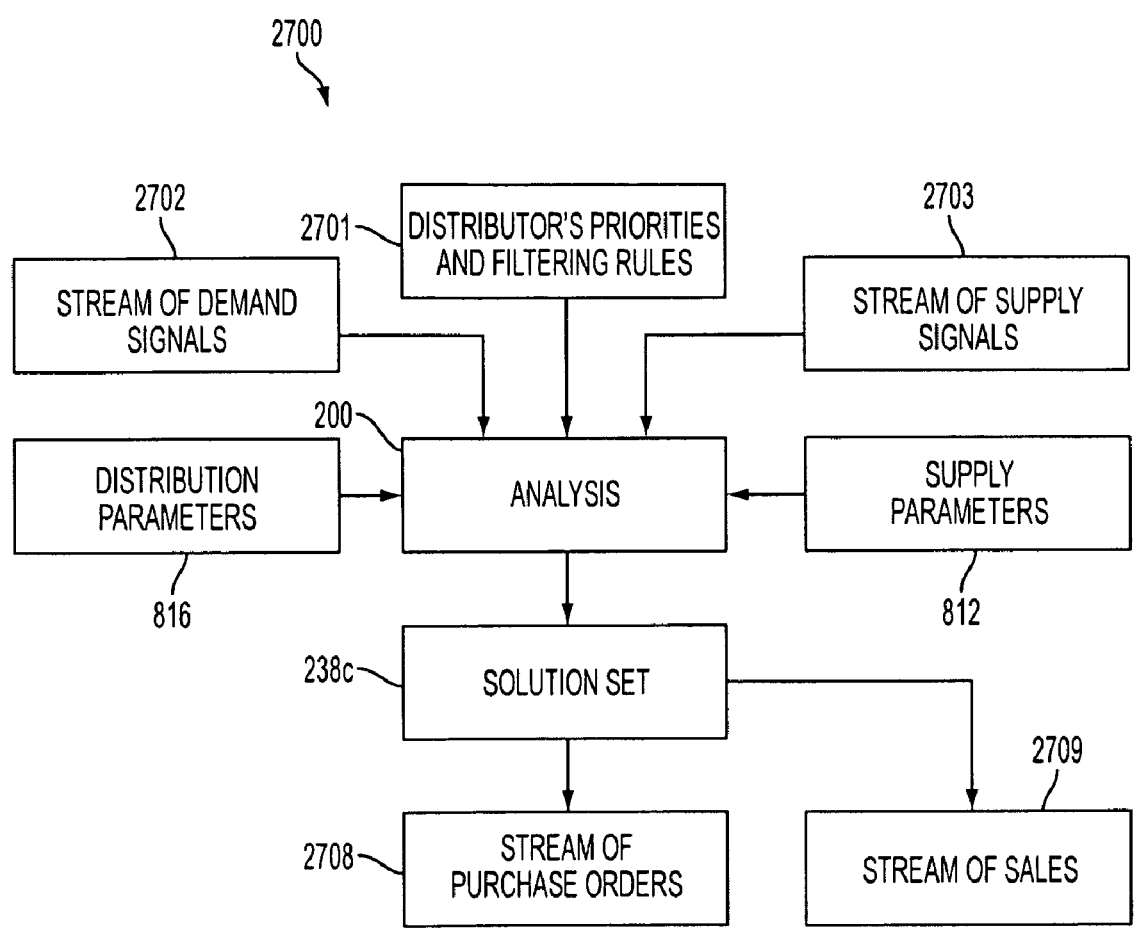
FIG. 27 is a block flow diagram illustrating an exemplary distributor transaction consistent with the present disclosure.

FIG. 27 illustrates one embodiment 2700 of an analysis system and method consistent with the present disclosure for the benefit of a distributor. For example, a distributor's priorities and filtering rules 2701, e.g. as presented as distribution parameters 816 in a distributor interface 804 may be combined with a stream of demand signals 2702 and a stream of supply signals 27033, along with a set of distribution parameters 816 and supply parameters 812 by the analysis system 200 to generate a solution set 238*c*. The solution set 238*c* may be presented to the distributor which may then generate a stream of purchase orders 2708 and a separate or associated stream of sales orders 2709.

Figure 28:
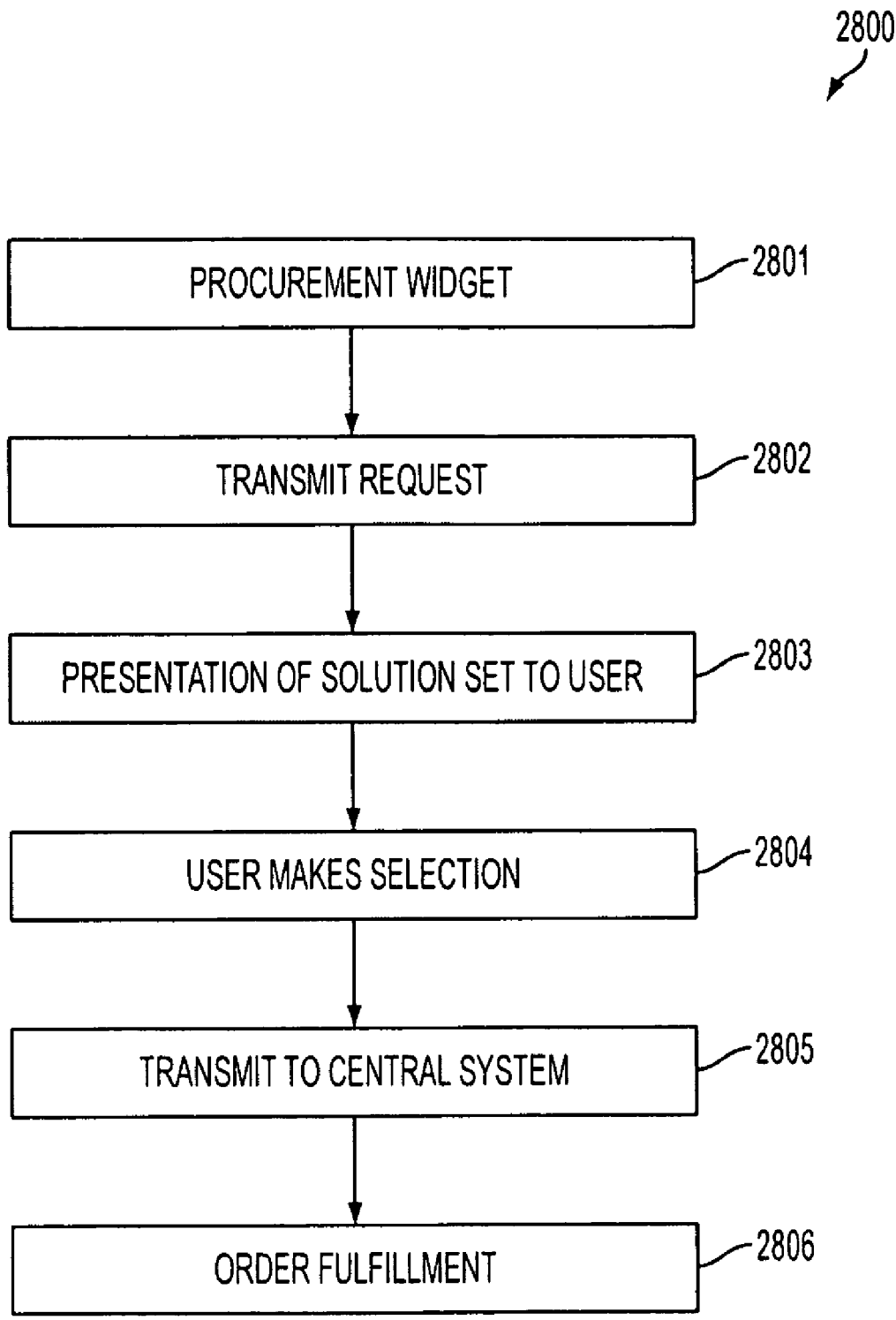
FIG. 28 is a block flow diagram illustrating an exemplary consumer transaction consistent with the present disclosure involving a widget.

Referring now to FIG. 28, one embodiment 2800 of a distribution system and method according to the present disclosure may include a procurement widget which may be freely shared among users of computer systems. For example, the widget may comprise an application that is readily shared by e-mail, by dragging between application pages, by downloading from another source or being propagated by any number of conventional means of disseminating software code and may also include the code necessary to interact with a central web application. According to one embodiment, the widget may be a file that may appear to a user as an icon that can be readily shared with other users by cutting and pasting or dragging and dropping between application windows. This widget may be e-mailed to other users as a web link or copied and pasted from one user's customizable webpage in a particular application to another user's customizable webpage.

In the illustrated exemplary embodiment, the widget 2801 on a given user's machine may then transmit 2802 a request, which may represent a consumer inquiry as previously described, to a central system. The central system may include an analysis system 200 configured to generate a solution set of options which may be transmitted back to the widget 2801 for presentation to the user 2803. The user may make a selection 2804, which may be transmitted to the central system 2805. Optionally, upon receipt of the selection 2804, the order may be processed 2806. According to one embodiment, the procurement widget 2501 may comprise location based information on the consumer that may be entered by the consumer, or may be autonomously developed, such as by sensing the consumer's location from his IP address.

Figure 29:
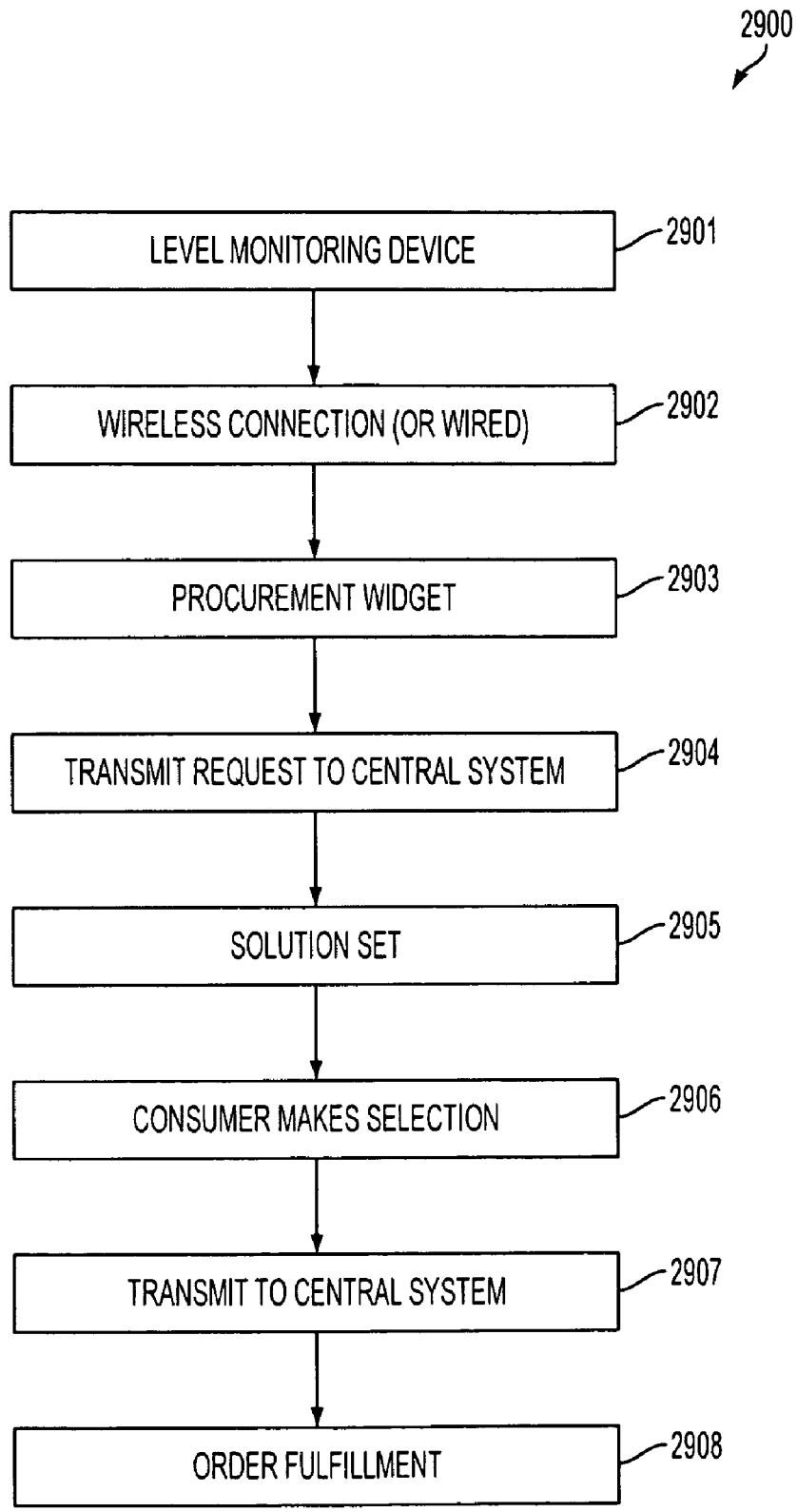
FIG. 29 is a block flow diagram illustrating another exemplary consumer transaction consistent with the present disclosure involving a widget.

According to a further embodiment 2900, a method consistent with the present disclosure may be configured to automatically monitor a product level and generate a consumer inquiry upon meeting or exceeding a minimum threshold level. Referring to FIG. 29, a consumer's location may include a storage system configured to store a quantity of a product. The storage system may include a level monitoring device configured to monitor a quantity of product contained within the storage system and may be configured to receive consumer definable parameters such as, but not limited to, a minimum quantity storage threshold. The monitoring device may be configured to generate 2901 and/or transmit a signal across a wireless or wired connection 2902 configured to notify a procurement widget 2903 that a minimum quantity storage threshold has been reached and/or exceeded. Upon receipt of the notification, the procurement widget may transmit 2904 a signal to the central system to initiating the process of generating a consumer inquiry as discussed above with respect to FIG. 28.

The level monitoring device and/or the central system may generate a signal to notify the consumer that the minimum quantity storage threshold has been reached and/or exceeded. The central system may also present the consumer with a solution set 2905 for selection 2906 by the consumer. The selection may be transmitted 2907 to the central system and the order may be filled 2908. In one embodiment, the consumer may provide the central system with demand parameters (e.g., price parameters, delivery time parameters, etc.) that the central system may utilize to automatically generate a purchase order, for example, to refill the storage system with the lowest delivered cost option according to pre-established criteria.

Figure 30:
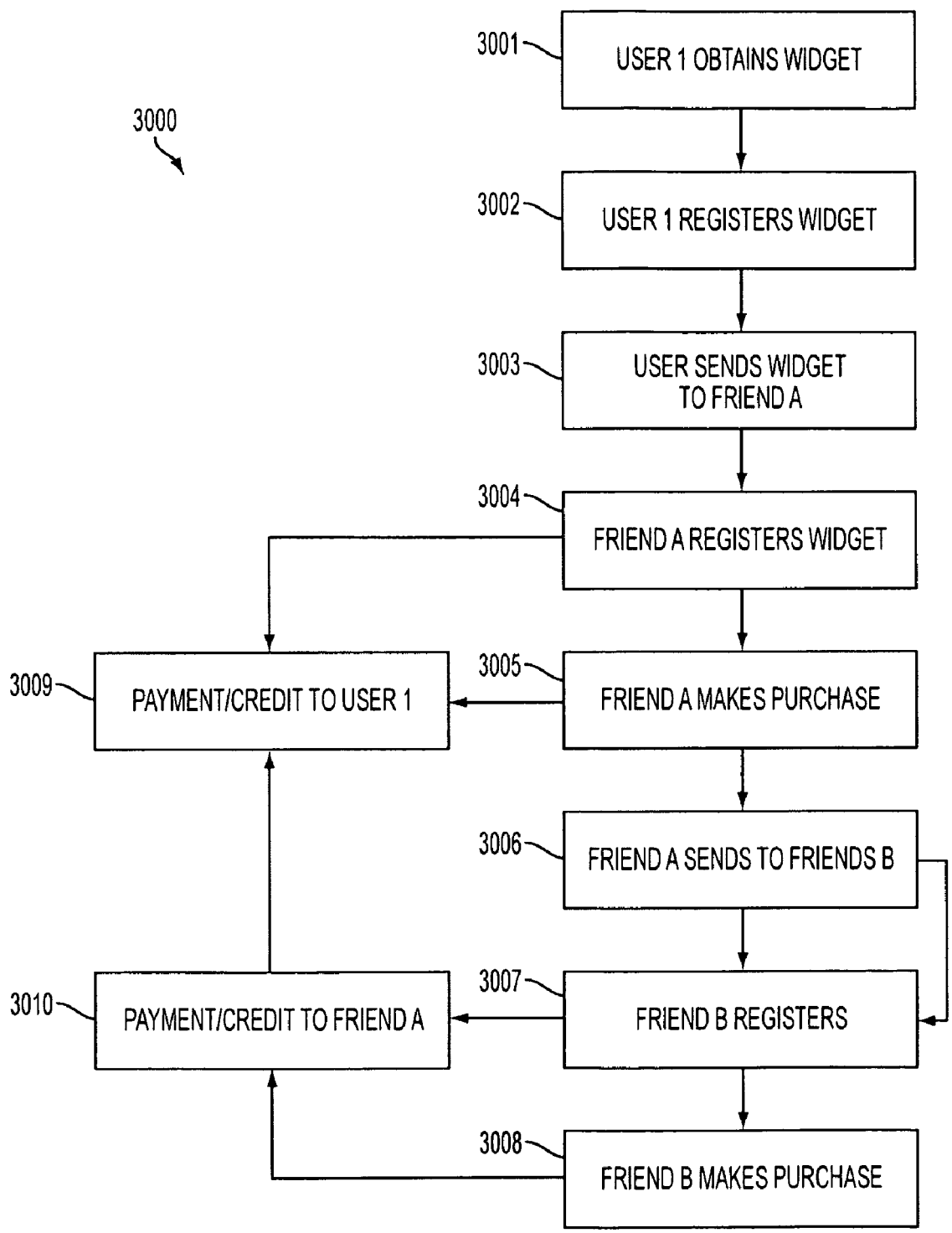
FIG. 30 is a block flow diagram illustrating another exemplary consumer transaction consistent with the present disclosure involving a widget.

One embodiment 3000 of a multi-layer marketing widget consistent with the present disclosure is shown in FIG. 30. For example, a user may obtain 3001 a multi-layer marketing widget and may register it 3002. A variety of ways of registering the widget are possible. For example, the user may act upon the widget to register it, or the widget may automatically register itself upon installation on the user's machine. The user may send 3003 the multi-layer marketing widget to Friend A, and Friend A may register 3004 the widget. When Friend A makes a purchase 3005, value, e.g. a payment or credit, may be issued to the user in response to Friend A's registration of the widget and/or purchase of goods or services. Moreover, Friend A may transmit 3006 the multi-layer marketing widget to Friend B, whereupon Friend B may register 3007 the multi-layer marketing widget. A payment and/or credit may be issued 3009, 3010 to Friend A and B when Friend B makes a purchase 3008. Registration may occur autonomously with the purchase of a product according with the principles described above.

A multi-layer marketing widget consistent with the present disclosure may be used in a a successive sequence of referrals, for example from an original user or recipient of the widget to Friend A, to Friend B, to Friend C . . . Friend N, where each person or entity in the referral chain receives some form of compensation. For example, users of the system may be compensated for referring a friend, and also for the referrals generated by that friend, within a multi-layer marketing compensation arrangement.

Figure 31:
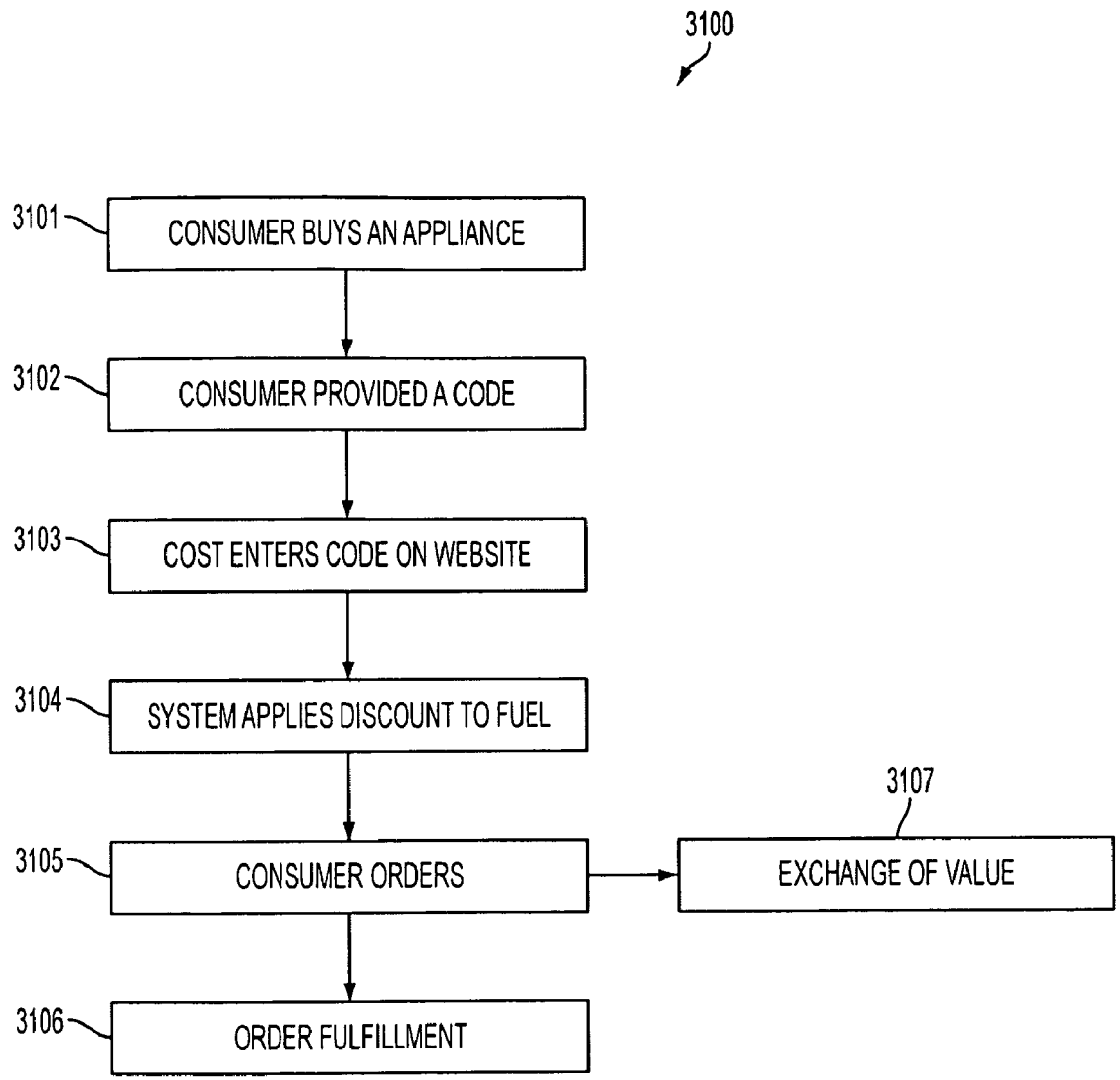
FIG. 31 is a block flow diagram illustrating an exemplary consumer transaction consistent with the present disclosure involving purchase of an product consuming device.

FIG. 31 shows one embodiment 3100 of method consistent with the present disclosure for linking a specific, delivered type of distributed product (for example, but not limited to, a fuel) to an associated product consuming device, e.g. a heating appliance, at a consumer's location. For example, a consumer may buy 3101 an product consuming device, and may be provided 3102 with a code. The code may be entered on a website 3, e.g using analysis tool 130, which may then apply 3104 a discount to a fuel purchase from one or more vendor associated with the code. If the consumer orders 3205 the fuel from a vendor associated with the code, then an exchange of value 3017 may occur between the seller of the product consuming device and the seller of the fuel and the order may be fulfilled 3106. For example, the fuel seller may pay the seller of the product consuming device a commission, or the seller of the product consuming device may credit the fuel seller for a portion of the fuel. The system and method may also be applied to delivery of more than one product to a particular location. For example, in FIG. 31 it may be advantageous to concurrently deliver both the product and the fuel, and the previously described distribution parameters may include information on the distribution of both elements of the system. The passing of value to a client should be understood to be possible in any form, such as a discount, a credit, a rebate or credit towards other products or services.

Figure 32:
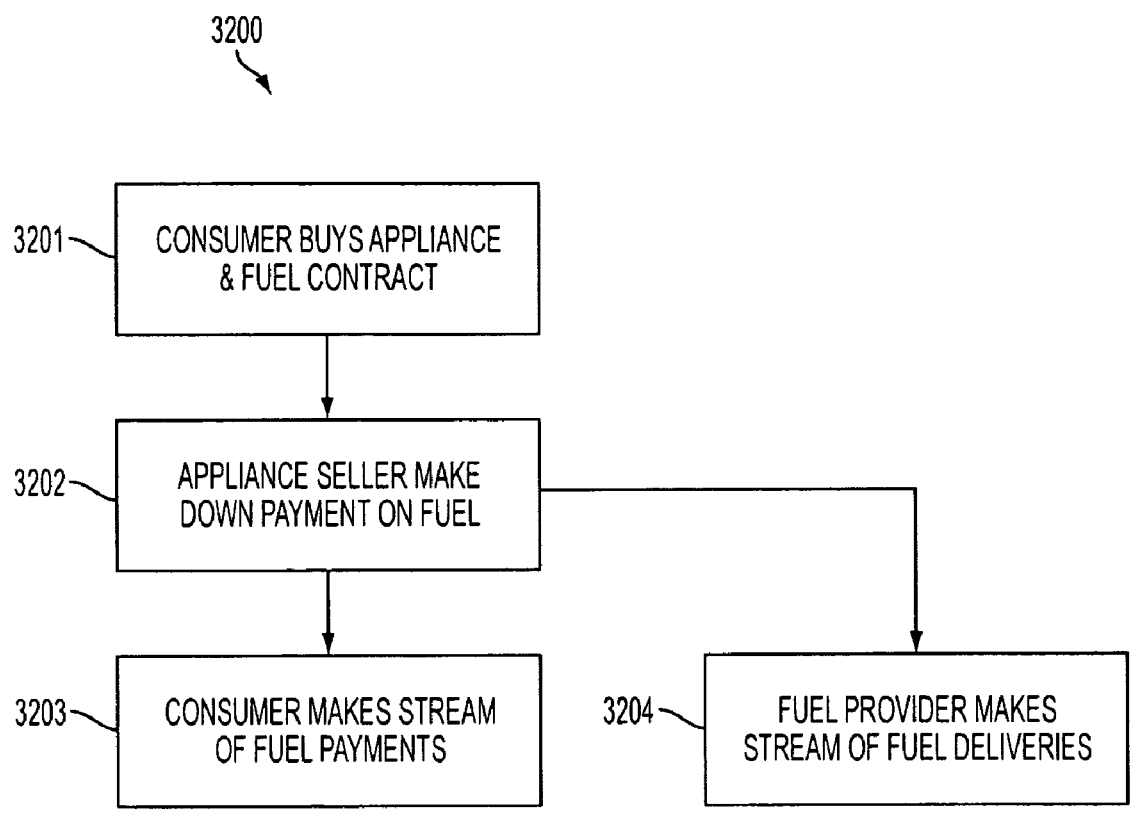
FIG. 32 is a block flow diagram illustrating another exemplary consumer transaction consistent with the present disclosure involving purchase of an product consuming device.

Another embodiment 3200 a method for linking a specific, delivered type of distributed product (for example, but not limited to, a fuel) to an associated product consuming device is shown in FIG. 32. For example, a consumer may buy 3201 both a product consuming device and a fuel contract substantially concurrently. The product consuming device provider may make a down payment on the fuel 3202, after which the consumer may make a stream of payments 3203 to the product consuming device provider, while the fuel provider makes a stream of deliveries 3204. The product consuming device provider and fuel provider may be the same or different parties, and the exchange of value between product consuming device provider and fuel provider (if any) may take several forms such as, but not limited to, a cash exchange, credit exchange, or the like.

Figure 33:
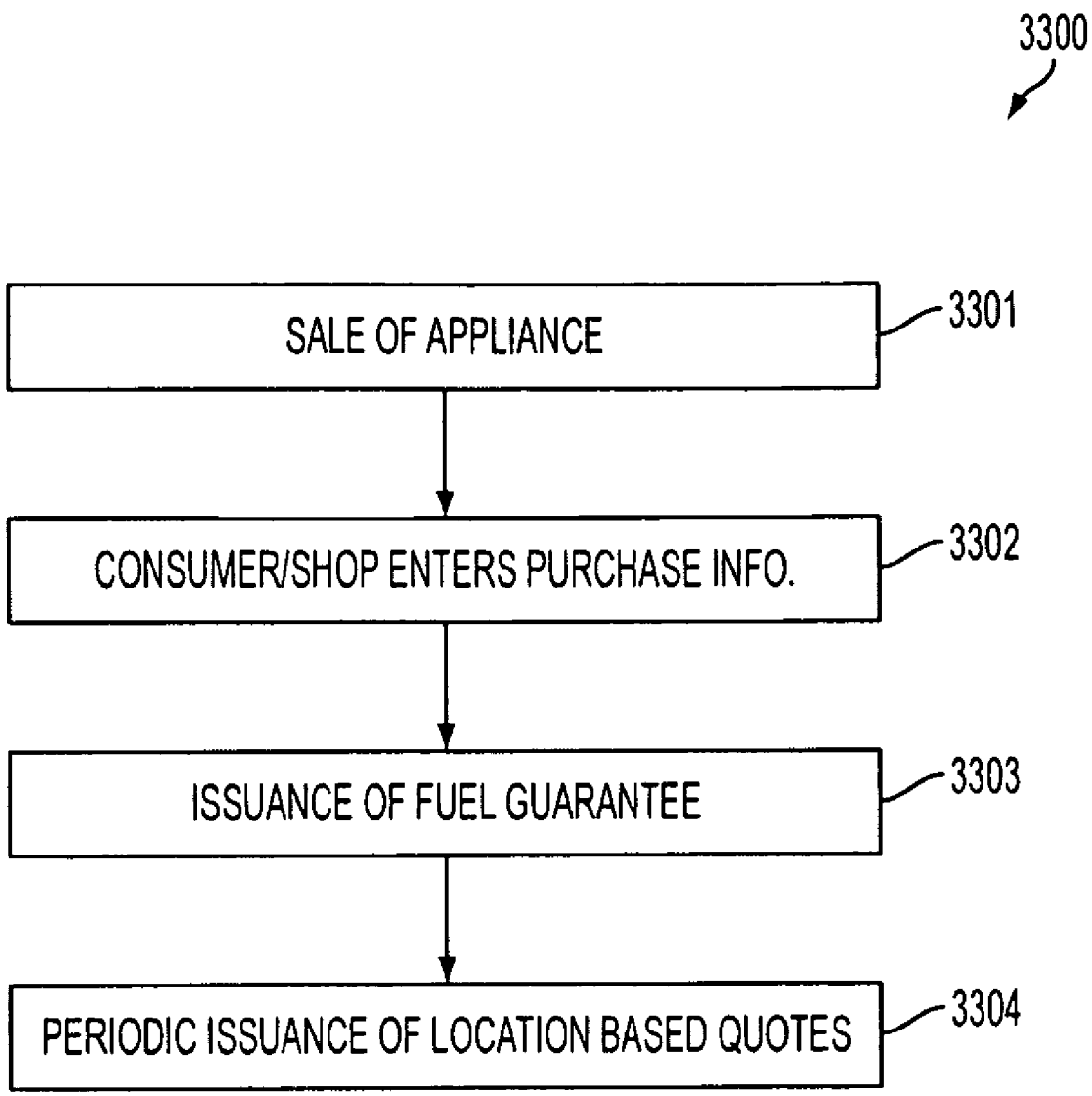
FIG. 33 is a block flow diagram illustrating another exemplary consumer transaction consistent with the present disclosure involving purchase of a product consuming device.

FIG. 33 illustrates and another embodiment 3300 of a method consistent with the present disclosure. Upon sale 3301 of a product consuming device requiring a stream of fuel, a consumer or shop that sold the product consuming device may enter 3302 information relating to the purchase (such as, but not limited to, the serial number of the product consuming device, the location of the product consuming device, the purchase date of the product consuming device, or the like) into a website which may prompt issuance of a fuel guarantee 3303 from a fuel supplier. A user who has such a guarantee may then be issued a stream of location based quotes 23304 consistent with any embodiment described herein.

Embodiments of the methods described above may be implemented as software or a computer program product for use with a processing system or computer. Such implementation may include, without limitation, a series of computer instructions that embody all or part of the functionality described herein. The series of computer instructions may be stored in any machine-readable medium, such as semiconductor, magnetic, optical or other memory devices, and may be transmitted using any communications technology, such as optical, infrared, microwave, or other transmission technologies. Such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web). Alternative embodiments of the invention may be implemented as pre-programmed hardware elements or as a combination of hardware, software and/or firmware.

According to one aspect of the disclosure, there is provided a method for facilitating transactions regarding goods or services, the method including: providing access to an analysis tool on a computer network; receiving consumer input to the analysis tool, the consumer input representing an inquiry regarding purchase of the goods or services; receiving input from each of a plurality of producers to the analysis tool, each of the inputs from the producers including supply parameters associated with the goods or services; receiving input from a plurality of distribution intermediaries to the analysis tool, each of the inputs from the distribution intermediaries including distribution parameters associated with the goods or services; and presenting a solution set to the consumer, at least one of the producers, or at least one of the distribution intermediaries through the analysis tool in response to the inquiry, the supply parameters and the distribution parameters, the solution set including a plurality of options for purchasing or selling the goods or services.

According to another aspect of the disclosure, therefore, there is provided a method for facilitating transactions regarding goods or services produced by a producer, the method including: providing access to an analysis tool on a computer network; receiving consumer input to the analysis tool, the consumer input representing an inquiry regarding purchase of the goods or services; and presenting a solution set to the consumer through the analysis tool, the solution set including a plurality of options for purchasing the goods or services produced by the producer, a first one of the options including a first delivered cost to the consumer associated with a first distribution channel in a multi-channel distribution network and a second one of the options including a second delivered cost to the consumer associated with a second distribution channel of the multi-channel distribution network, at least one of the first or second distribution channels including at least one distribution intermediary not present in the other of the first or second distribution channels.

According to another aspect of the disclosure, there is provided a method for facilitating transactions regarding goods or services produced by multiple producers, the method including: providing access to an analysis tool on a computer network; receiving consumer input to the analysis tool, the consumer input representing an inquiry regarding purchase of the goods or services; receiving input from the each of the producers to the analysis tool, each of the inputs from the producers including supply parameters associated with the goods or services; receiving input from a plurality of distribution intermediaries to the analysis tool, each of the inputs from the distribution intermediaries including distribution parameters associated with the goods or services; and presenting a solution set to the consumer through the analysis tool in response to the supply parameters and the distribution parameters, the solution set including a plurality of options for purchasing the goods or services, a first one of the options including a first delivered cost to the consumer associated with a first distribution channel in a multi-channel distribution network and a second one of the options including a second delivered cost to the consumer associated with a second distribution channel of the multi-channel distribution network, at least one of the first or second distribution channels including at least one of the distribution intermediaries not present in the other of the first or second distribution channels.

According to yet another aspect of the disclosure, there is provided a method for facilitating transactions regarding goods or services produced by a producer, the method including: providing access to an analysis tool on a computer network; receiving input from a plurality of consumers input to the analysis tool, each of the inputs from the consumers representing a price the consumer is willing to pay for the goods or services; and presenting a solution set to the producer through the analysis tool, the solution set including a plurality of options for selling the goods or services to the consumers, each of the options including a cost to the producer for delivering the goods or services to an associated one of the consumers and the price the associated one of the consumers is willing to pay for the goods or services.

According to yet another aspect of the disclosure there is provided a method for facilitating transactions regarding goods or services, the method including: providing access to an analysis tool on a computer network; receiving input from a plurality of consumers input to the analysis tool, each of the inputs from the consumers representing a price the consumer is willing to pay for the goods or services; and receiving input from a plurality of producers of the goods or services to the analysis tool, each of the inputs from the producer representing a cost of the goods or services associated with the producer; presenting a solution set to a distribution intermediary through the analysis tool, the solution set including a plurality of options for selling the goods or services to the consumers, each of the options including a cost to the distribution intermediary for delivering the goods or services to an associated one of the consumers, the price the associated one of the consumers is willing to pay for the goods or services, and a cost of the goods or services associated with an associated one of the producers.

According to yet another aspect of the disclosure, there is provided method including providing value to potential consumers, the method including: sending a widget to a first potential consumer of goods or services, the widget including an application that is readily shared by email; receiving a first registration of the widget from the first potential consumer; receiving a second registration of the widget from a second potential consumer that received the widget by email from the first potential consumer; and granting the first potential consumer the value in response to the second registration.

While the principles of the invention have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for facilitating transactions regarding goods or services, said method comprising:
   providing access to an analysis tool on a computer network;
   receiving consumer input to said analysis tool, said consumer input representing an inquiry regarding purchase of said goods or services;
   receiving input from each of a plurality of producers to said analysis tool, each of said inputs from said producers comprising supply parameters associated with said goods or services;
   receiving input from a plurality of distribution intermediaries to said analysis tool, each of said inputs from said distribution intermediaries comprising distribution parameters associated with said goods or services; and
   presenting a solution set to said consumer, at least one of said producers, or at least one of said distribution intermediaries through said analysis tool in response to said inquiry, said supply parameters and said distribution parameters, said solution set comprising a plurality of options for purchasing or selling said goods or services;
   wherein said analysis tool provides a consumer interface for receiving said inquiry, a separate producer interface for receiving said supply parameters, and a separate distributor interface for receiving said distribution parameters.

2. A method according to claim 1, wherein said solution set comprises a plurality of options for purchasing said goods or services, a first one of said options comprising a first delivered cost to the consumer associated with a first distribution channel in a multi-channel distribution network and a second one of said options comprising a second delivered cost to the consumer associated with a second distribution channel of said multi-channel distribution network, at least one of said first or second distribution channels comprising at least one of said distribution intermediaries not present in the other of said first or second distribution channels.

3. A method according to claim 2, wherein at least one distribution channel in said multi-channel distribution network comprises a multi-level distribution channel.

4. A method according to claim 1, wherein said solution set comprises a plurality of options for purchasing said goods or services from each of a plurality of producers presented in said solution set in response to said consumer's geographic location.

5. A method according to claim 1, wherein said inquiry comprises an inquiry regarding delivery of a specified quantity of said goods or services to a specified location and wherein said solution set solution set is presented in response to supply parameters or distribution parameters representing a predetermined minimum quantity that may be delivered to said specified location.

6. A method according to claim 1, wherein said inquiry comprises an inquiry regarding delivery of a specified quantity of said goods or services to a specified location and wherein said solution set solution set is presented in response to supply parameters or distribution parameters representing a predetermined auto-acceptance quantity representing a quantity above which any orders will be automatically accepted.

7. A method according to claim 1, wherein at least one of said distribution intermediaries comprises a distribution intermediary selected from the group consisting of: an agent selling said goods or services directly on behalf of said producer, a packager that packages said goods or services, a distributor that sells said good or services to retailers, and a retailer that sells said goods or services to other consumers.

8. A method according to claim 1, wherein said inquiry comprises an inquiry regarding delivery of a specified quantity of said goods or services to within a specified region.

9. A method according to claim 8, wherein said region is defined by a selected radius from a consumer location.

10. A method according to claim 1, wherein said goods or services comprise wood pellets.

11. A method according to claim 1, wherein said goods or services comprise a good selected from the group consisting of: fuels, landscaping products, and building materials.

12. A method according to claim 1, wherein said plurality of options comprises different quantities of said goods or services.

13. A method according to claim 1, wherein said plurality of options comprises different qualities of said goods or services.

14. A method according to claim 1, wherein said plurality of options comprises different timing of delivery of said goods or services.

15. A method according to claim 1, wherein said goods or services comprises fuel, and wherein plurality of options comprise a display of cost per energy content associated with said fuel.

16. A method according to claim 1, wherein said set of options is presented to said consumer through an email to said consumer.

17. A method according to claim 16, wherein said email comprises a purchase button for purchasing said goods or services according to one of said options.

18. A method according to claim 1, wherein said inquiry is automatically initiated by a widget comprising an application that is readily shared by e-mail or by copying a file between users of a common application.

19. A method according to claim 18, wherein said widget generates said consumer input in response to a level monitor associated with a storage system.

20. A method according to claim 18, wherein said consumer receives a discount on said goods or services as a result of passing the widget on to another consumer.

21. A method according to claim 1, wherein said consumer inquiry is generated in response to purchase of a product consuming device by said consumer.

22. A method according to claim 1, wherein said solution set is presented to at least one of said producers.

23. A method according to claim 1, wherein said solution set is presented to at least one of said distribution intermediaries.

24. A method according to claim 1, wherein said solution set is presented to said consumer.

* * * * *